(12) United States Patent
Mosayyebpour et al.

(10) Patent No.: US 11,087,213 B2
(45) Date of Patent: *Aug. 10, 2021

(54) BINARY AND MULTI-CLASS CLASSIFICATION SYSTEMS AND METHODS USING ONE SPIKE CONNECTIONIST TEMPORAL CLASSIFICATION

(71) Applicant: SYNAPTICS INCORPORATED, San Jose, CA (US)

(72) Inventors: Saeed Mosayyebpour, Irvine, CA (US); Trausti Thormundsson, Irvine, CA (US); Francesco Nesta, Aliso Viejo, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,974

(22) Filed: Dec. 20, 2019

(65) Prior Publication Data

US 2020/0125951 A1   Apr. 23, 2020

Related U.S. Application Data

(63) Continuation-in-part of application No. 15/894,883, filed on Feb. 12, 2018, now Pat. No. 10,762,891.

(Continued)

(51) Int. Cl.
*G06N 3/08*   (2006.01)
*G06N 3/04*   (2006.01)
(Continued)

(52) U.S. Cl.
CPC ............ *G06N 3/08* (2013.01); *G06N 3/049* (2013.01); *G06N 3/0445* (2013.01); *G10L 15/02* (2013.01);
(Continued)

(58) Field of Classification Search
CPC ....... G10L 15/00; G10L 15/02; G10L 15/063; G10L 15/16; G10L 15/22; G10L 2015/025; G06N 3/0445; G06N 3/08; G06N 3/049

(Continued)

(56) References Cited

U.S. PATENT DOCUMENTS 5,155,763 A * 10/1992 Bigus ................. G06N 3/105
                                                         379/111
5,630,023 A *  5/1997 Oteki ................. G06F 7/68
                                                         706/41

(Continued)

*Primary Examiner* — Michael Colucci
(74) *Attorney, Agent, or Firm* — Haynes and Boone LLP

(57) ABSTRACT

A classification training system for binary and multi-class classification comprises a neural network operable to perform classification of input data, a training dataset including pre-segmented, labeled training samples, and a classification training module operable to train the neural network using the training dataset. The classification training module includes a forward pass processing module, and a backward pass processing module. The backward pass processing module is operable to determine whether a current frame is in a region of target (ROT), determine ROT information such as beginning and length of the ROT and update weights and biases using a cross-entropy cost function and One Spike Connectionist Temporal Classification (OSCTC) cost function. The backward pass module further computes a soft target value using ROT information and computes a signal output error using the soft target value and network output value.

20 Claims, 12 Drawing Sheets

Related U.S. Application Data

(60) Provisional application No. 62/457,663, filed on Feb. 10, 2017, provisional application No. 62/465,723, filed on Mar. 1, 2017.

(51) Int. Cl.
  *G10L 15/16* (2006.01)
  *G10L 15/22* (2006.01)
  *G10L 15/02* (2006.01)
  *G10L 15/06* (2013.01)

(52) U.S. Cl.
  CPC ............ *G10L 15/063* (2013.01); *G10L 15/16* (2013.01); *G10L 15/22* (2013.01); *G10L 2015/025* (2013.01)

(58) Field of Classification Search
  USPC .......................................... 704/232; 714/748
  See application file for complete search history.

(56) References Cited

U.S. PATENT DOCUMENTS

| | | | | |
|---|---|---|---|---|
| 6,041,299 A | * | 3/2000 | Schuster | G10L 15/16 704/232 |
| 6,470,261 B1 | * | 10/2002 | Ng | G06K 9/00785 701/117 |
| 6,615,382 B1 | * | 9/2003 | Kang | H04L 1/0009 714/748 |
| 6,728,404 B1 | * | 4/2004 | Ono | G06K 9/3241 382/118 |
| 7,110,526 B1 | * | 9/2006 | Dezonno | H04M 3/5232 379/265.02 |
| 8,675,839 B1 | * | 3/2014 | Noble, Jr. | H04M 3/5232 379/112.08 |
| 9,191,304 B1 | * | 11/2015 | Plate | H04L 12/6418 |
| 9,723,144 B1 | * | 8/2017 | Gao | H04M 3/5238 |
| 10,013,640 B1 | * | 7/2018 | Angelova | G06K 9/00624 |
| 10,114,554 B1 | * | 10/2018 | Gonzalez | G06F 3/0647 |
| 2003/0115041 A1 | * | 6/2003 | Chen | G10L 19/002 704/200.1 |
| 2003/0225786 A1 | * | 12/2003 | Hall | G06Q 30/02 |
| 2005/0216426 A1 | * | 9/2005 | Weston | G06K 9/6256 706/12 |
| 2005/0261898 A1 | * | 11/2005 | Van Klinken | H04L 25/03019 704/219 |
| 2010/0198054 A1 | * | 8/2010 | Ewing | A61B 5/055 600/420 |
| 2011/0224975 A1 | * | 9/2011 | Li | G10L 19/08 704/203 |
| 2015/0381809 A1 | * | 12/2015 | Fleming | H04M 3/5232 379/265.11 |
| 2016/0048766 A1 | * | 2/2016 | McMahon | G06N 20/20 706/12 |
| 2017/0005644 A1 | * | 1/2017 | Sayeh | G02F 1/00 |
| 2017/0083829 A1 | * | 3/2017 | Kang | G06N 3/0454 |
| 2017/0148431 A1 | * | 5/2017 | Catanzaro | G10L 15/063 |
| 2017/0249551 A1 | * | 8/2017 | Iljazi | G06F 3/0623 |
| 2017/0344829 A1 | * | 11/2017 | Lan | G06K 9/00369 |
| 2017/0372197 A1 | * | 12/2017 | Baughman | A23L 33/30 |
| 2018/0203848 A1 | * | 7/2018 | Perez | G10L 25/30 |
| 2018/0233130 A1 | * | 8/2018 | Kaskari | G10L 15/16 |
| 2018/0253648 A1 | * | 9/2018 | Kaskari | G06N 3/084 |

* cited by examiner

Forward Pass

Backward Pass

Forward Pass

Backward pass

BINARY AND MULTI-CLASS CLASSIFICATION SYSTEMS AND METHODS USING ONE SPIKE CONNECTIONIST TEMPORAL CLASSIFICATION

CROSS-REFERENCE TO RELATED APPLICATIONS

This application is a continuation-in-part of U.S. patent application Ser. No. 15/894,883, filed Feb. 12, 2018, titled "Binary and Multi-Class Classification Systems and Methods Using Connectionist Temporal Classification," which claims the benefit of and priority to both U.S. Provisional Patent Application No. 62/457,663 filed Feb. 10, 2017 and entitled "Connectionist Temporal Classification (CTC) Network Using Cross-Entropy Cost Function for Binary Classification" and U.S. Provisional Patent Application No. 62/465,723 filed Mar. 1, 2017 and entitled "Recurrent Network For Connectionist Temporal Classification (CTC) Using Segmented Labeled Sequence Data," all of which are incorporated herein by reference in their entirety.

TECHNICAL FIELD

The present application relates generally to information classification, and more particularly, for example, to binary and multi-class classification systems and methods for use in speech recognition systems.

BACKGROUND

Recurrent neural networks are commonly used in information classification systems, which may include binary classification speech recognition applications (e.g., keyword spotting) and multi-class classification speech recognition applications (e.g., phoneme recognition). In one approach, an Artificial Neural Network (ANN) classifier is combined with a Hidden Markov Model (HMM) to transform network classifications into labeled sequences. The HMM is typically used to model the long range sequential structure of the data while the ANN is used to provide localized classifications. The use of an HMM model, however, requires unnecessary assumptions about the data. A Recurrent Neural Network (RNN) may also be combined with HMMs to label input sequences, but traditional approaches fail to exploit the full potential of RNN for modeling sequential data.

Further, many approaches are often highly complex and may not be practical for use in applications with memory, power and processing limitations, such as mobile telephones and other low power devices. Efforts to reduce complexity often come at the cost of less flexibility, memory inefficiencies, and other undesirable performance measures. In view of the foregoing, there is a need in the art for solutions to optimize information classification systems for training neural networks that are both fast and resource efficient.

SUMMARY

The present disclosure provides systems and methods that address a need in the art for improved binary and multi-class classification, including novel one spike connectionist temporal classification (OSCTC) systems and methods for training a neural network for binary classification, such as keyword spotting, when pre-segmented labeled data is available.

In various embodiments, a computer-implemented method for training a recurrent neural network for speech recognition includes receiving, at a computing device, a stream of training data including a plurality of input samples having segmented labeled data, computing, by the computing device, a network output for each input sample in a forward pass through the training data, and updating, by the computing device, weights and biases through a backward pass through the training data, including determining whether an input frame is in a Region of Target (ROT), estimating the update of the weights and the biases of the recurrent neural network based, and adaptively learning to improve a convergence rate of the recurrent neural network. The method may further include finding ROT information, including a beginning and length of the ROT. Adaptively learning to improve a convergence rate of the recurrent neural network may include determining a momentum for the weights and biases of an output layer and computing the root mean square of gradients for all of the weights and biases not in the output layer.

The recurrent neural network may be trained for phenome recognition using multi-class classification or may be trained for keyword detection using binary classification, and the method may further include updating, by the computing device, weights and biases through a backward pass further comprises computing signal error for all out nodes using a cross-entropy cost function for non-ROT regions and computing a soft target for all the frames of the ROT. In various embodiments, two cost functions are used to compute the signal error, the two cost functions including a One Spike Connectionist Temporal Classification (OSCTC) cost function used for a target node of the ROT and a blank node, and a cross entropy cost function used for all remaining nodes of the recurrent neural network.

In various embodiments, a classification training system includes a neural network for use in a classification of input data, a training dataset providing segmented labeled training examples, and a classification training module for training the neural network using the segmented labeled training data. The classification training module includes a forward pass processing module and a backward pass processing module. The forward pass processing module may be configured to train the neural network by generating neural network outputs for the training data using current value of weights and biases for the neural network. The backward pass processing module may be configured to train the neural network by updating the weights and biases by passing backward through the generated neural network outputs, determining whether an input frame is in a Region of Target (ROT), and adaptively learning to improve a convergence rate of the neural network. In some embodiments, adaptively learning to improve a convergence rate of the neural network includes determining a momentum for the weights and biases of an output layer and computing a root mean square of gradients for all of the weights and biases other than in the output layer.

In various embodiments, the weights and biases are updated by computing a signal error for all output nodes using a cross-entropy cost function for non-ROT regions. The weights and biases may be updated by improving the convergence rate by using an adaptive learning rate algorithm. The training system may further include a memory storing a ROT data (e.g., an ROT table), and the backward pass module may include an ROT information module operable to find a beginning and a length of the ROT using the ROT data. In one embodiment, the backward pass module further includes a soft target module configured for computing a soft target for all the frames of the ROT. In some embodiments, two cost functions are used to compute the signal error, and the two cost functions include an OSCTC cost function used for target node of the ROT and a blank node and across entropy cost function used for all remaining nodes. In various embodiments, the classification training module may be operable to train for phoneme recognition using multi-class classification or train for keyword spotting using binary classification.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. The included drawings are for illustrative purposes and serve only to provide examples of possible systems and methods for the disclosed methods and systems. These drawings in no way limit any changes in form and detail that may be made to that which is disclosed by one skilled in the art without departing from the spirit and scope of this disclosure.

DETAILED DESCRIPTION

Figure 1:
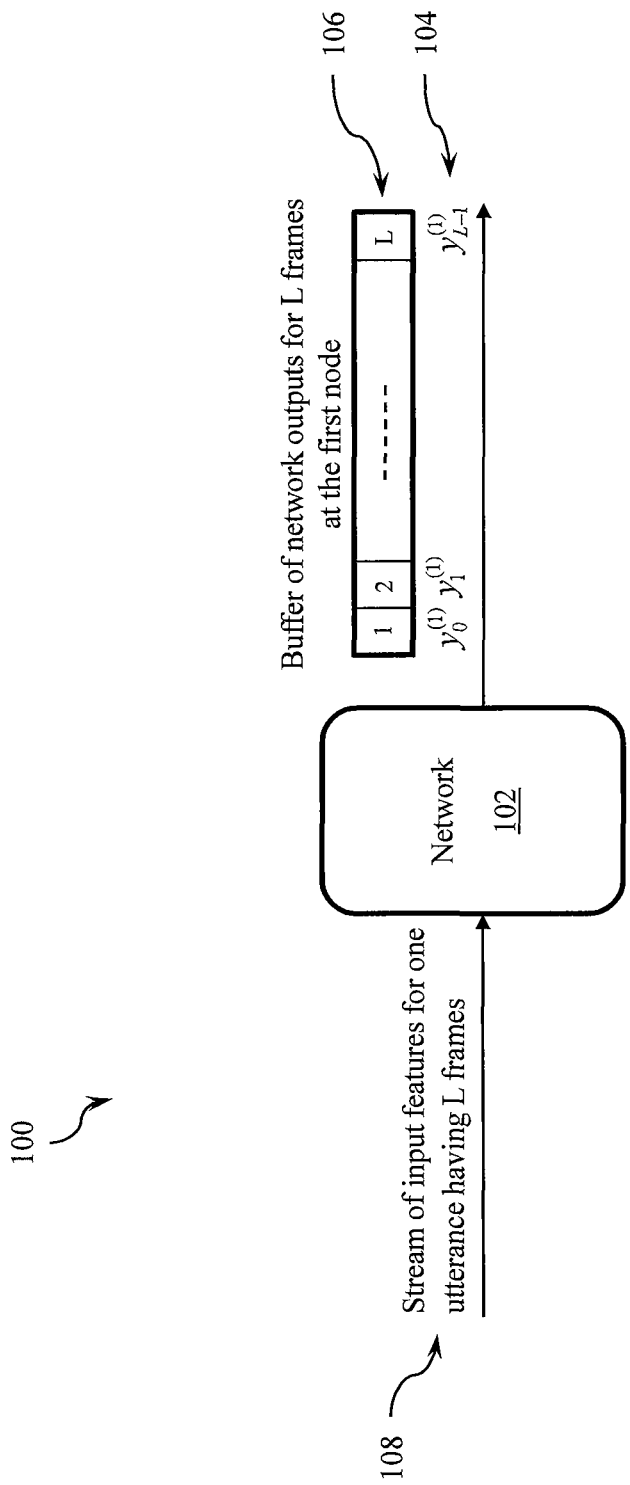
FIG. 1 illustrates an example binary classification system for performing a forward pass on training data to train an artificial neural network, in accordance with an embodiment.

In accordance with various embodiments of the present disclosure, systems and methods for training a recurrent neural network are disclosed, including systems and methods for binary classification, such as keyword spotting, and multi-class classification, such as phoneme recognition. In various embodiments disclosed herein, a novel One Spike Connectionist Temporal Classification (OSCTC) algorithm is proposed to train a neural network, such as a Long Short-Term Memory (LSTM) network, for binary classification, when pre-segmented labeled data is available.

Binary Classification

One goal of the binary classification systems disclosed herein is to generate a single spike when an event is detected, without requiring generation of multiple spikes in a period that the event is happening. For example, in keyword spotting task, a goal may be to generate one spike when the keyword is recognized. The proposed method disclosed herein provides relative effectiveness and computational efficiency over conventional Connectionist Temporal Classification (CTC) network training solutions for this type of binary classification task. In various embodiments, the methods disclosed herein provide faster convergence than conventional solutions.

For many binary classifications such as keyword spotting, connectionist temporal classification (CTC) training may be more desirable than the frame-wise training. For example, a trained system may be expected to have only one spike anywhere during the keyword duration indicating the detection of the keyword. In that case, the system does not need to produce multiple spikes at all the frames of the keyword. This leads to a system training that provides better performance. See, e.g., Santiago Fernandez, Alex Graves and Jurgen Schmidhuber, "An application of recurrent neural networks to discriminative keyword spotting," Proceedings of ICANN. Porto. pp 220-229 (2007), which is hereby incorporated by reference in its entirety.

A CTC network may be designed to maximize the probability of having correct labelling over all possible labelling. On the other hand, frame-wise training is designed to force the network to produce spikes at all the frames of the keyword. The frame-wise training may be sensitive to the alignment of training labeled data, so the training data should be correctly labeled consistently across all data. However, this requirement is not essential for CTC training since it removes the need for pre-segmented training data. Finally, a network using a frame-wise algorithm may be trained to make a series of independent label classifications. This implies that the network output will be post processed to give the final label sequence.

Although CTC training has several advantages over frame-wise training for binary classification, the conventional training algorithm of CTC training is not computationally efficient, and it has some problems and limitations such as an underflow problem for the computation and it can also have undesirable latency. In the present disclosure, a solution for training a neural network for binary classification is proposed that overcomes many of the aforementioned limitations and provides better performance. One difference between the proposed method using an OSCTC network and conventional solutions for training a CTC network is that pre-segmented labeled data is used in various embodiments of the solution disclosed herein. This information is used to realize a more computational efficient algorithm for training and it can also lead to better performance.

Among conventional approaches, a common solution for the task of binary classification such as keyword spotting is to use Hidden Markov Models (HMM). One drawback of HMM based systems is that they model the garbage (i.e. non-keyword) parts of the signal as well as the keywords themselves. A structure flexible enough to model all possible garbage words is likely to be able to model the keywords as well. However, HMM modeling solutions are characterized by suboptimal convergence of the Expectation Maximization (EM) algorithm to local maxima, the assumption of conditional independence of the observations, and the fact that HMMs do not directly maximize the keyword detection rate. It is recognized that a recurrent neural network can achieve better performance for this task. Among the recurrent networks such as LSTM or bidirectional LSTM (BLSTM) or Gated Recurrent Unit (GRU) networks may be used to improve context modeling to build a better keyword spotting system.

Conventional methods of using an LSTM network can be divided in two categories. The first category uses the recurrent network to provide the higher-level features for a classifier like Dynamic Bayesian Network (DBN) to perform the keyword spotting. Thus, the recurrent network combines the flexibility of the classifier like DBN architecture with the ability of a recurrent network such as LSTM to capture long-range time dependencies. This category of methods has the flexibility of defining new keywords during operation, with no need to retrain the network and so it does not require excessive amounts of training data for large vocabularies. However, such systems typically have high complexity due to having a big network, such as a large BLSTM network, to provide higher level features such as phoneme recognitions for a keyword spotting task. Therefore, these methods are not practical solutions for many applications, such as mobile phones and other low power devices.

The second category exploits a recurrent neural network in combination with Connectionist Temporal Classification (CTC) which is a discriminative system based on recurrent neural networks that use information from long time spans to estimate keyword probabilities. In a keyword spotting task, for example, this method attempts to model full keywords in the sequence data stream, while the first approach is based on sub-word units (phonemes). Unlike the methods in the first category, these methods lack flexibility with new keyword selection in a keyword spotting task and may require more keyword samples in the training data. One advantage of these methods is their efficiency and low complexity as compared to the first category of approaches. These methods are more practical for low power devices where computational complexity and memory consumption are a major bottleneck.

The conventional solutions using a recurrent neural network based on CTC have some limitations. First, a dynamic programming algorithm, similar to the forward backward algorithm for HMMs is used in the CTC network which increases the computational complexity. Second, unsegmented input data is used to train the CTC network and so there is insufficient control on the latency of the system. This can be a problem for the applications where latency is a concern. Third, the training convergence rate is slower compared to frame-wise training. Finally, for the CTC training of recurrent neural network including unidirectional and bidirectional LSTM, conventional approaches unroll the network by the length of the input sequence, which can consume a large amount of memory when the sequence is very long. Also, this "full unrolling" makes a parallel training with multiple sequences inefficient on shared memory models such as graphics processing units (GPUs), since the length of training sequences is usually not uniform, and thus a load imbalance problem may occur. In addition, the CTC algorithm may require full unrolling for the backward variable propagation, which starts from the end of the sequence.

The embodiments described herein have several advantages over conventional methods utilizing a recurrent neural network for binary classification. For example, a conventional CTC network (such as proposed in Graves, A., Fernandez, S., Gomez, F., Schmidhuber, J., "Connectionist temporal classification: labelling unsegmented sequence data with recurrent neural nets," Proceedings of the 23rd International Conference on Machine Learning, Pittsburgh-Pennsylvania (U.S.A.) (2006), which is hereby incorporated by reference) computes two variables, namely the forward and backward variables, recursively for the entire input sequence, which increases the computational complexity of the method because of its high number of multiplications especially with small valued numbers ranging between zero and one. The algorithms disclosed herein using OSCTC have low computational complexity and are well designed for the application of binary classification to train a recurrent neural network, such as an LSTM network, with high computational efficienlty.

Another advantage is that in a binary classification such as a keyword spotting task it is desired to build a system to predict the occurrence of the keyword towards the ending of the occurrence of the keyword. Otherwise, the system can have high false-detections for the case of non-keywords containing part of the keyword (e.g. the beginning of a non-keyword is the same as the beginning of the keyword). Conventional CTC networks, such as proposed in the preceding reference, cannot guarantee that the trained system will predict the keyword towards the ending of its occurrence since the network is forced to maximize the correct output labeling regardless of the alignment. In contrast, the methods proposed herein do not have this limitation; a trained network using the disclosed methods can be forced to predict the true keyword towards the ending of the keyword.

A third difference is that existing methods utilizing a CTC network have relatively high memory requirements during training since they require obtaining the network's output for the entire input sequence as well as recursively computing the forward and backward variables of the same length of input sequence. For the task of keyword spotting, for example, when the input sequence is very long the aforementioned conventional method is not memory efficient. In contrast, the methods disclosed herein are memory efficient since some embodiments update the network frame-wise for non-keyword parts of the input sequence and concentrate on a particular region which is called Region of Target (ROT) that can include the tail of the keyword. Another advantage over conventional approaches is that some embodiments disclosed herein use a most probable path to predict the keyword similarly to traditional frame-wise training.

Figure 2:
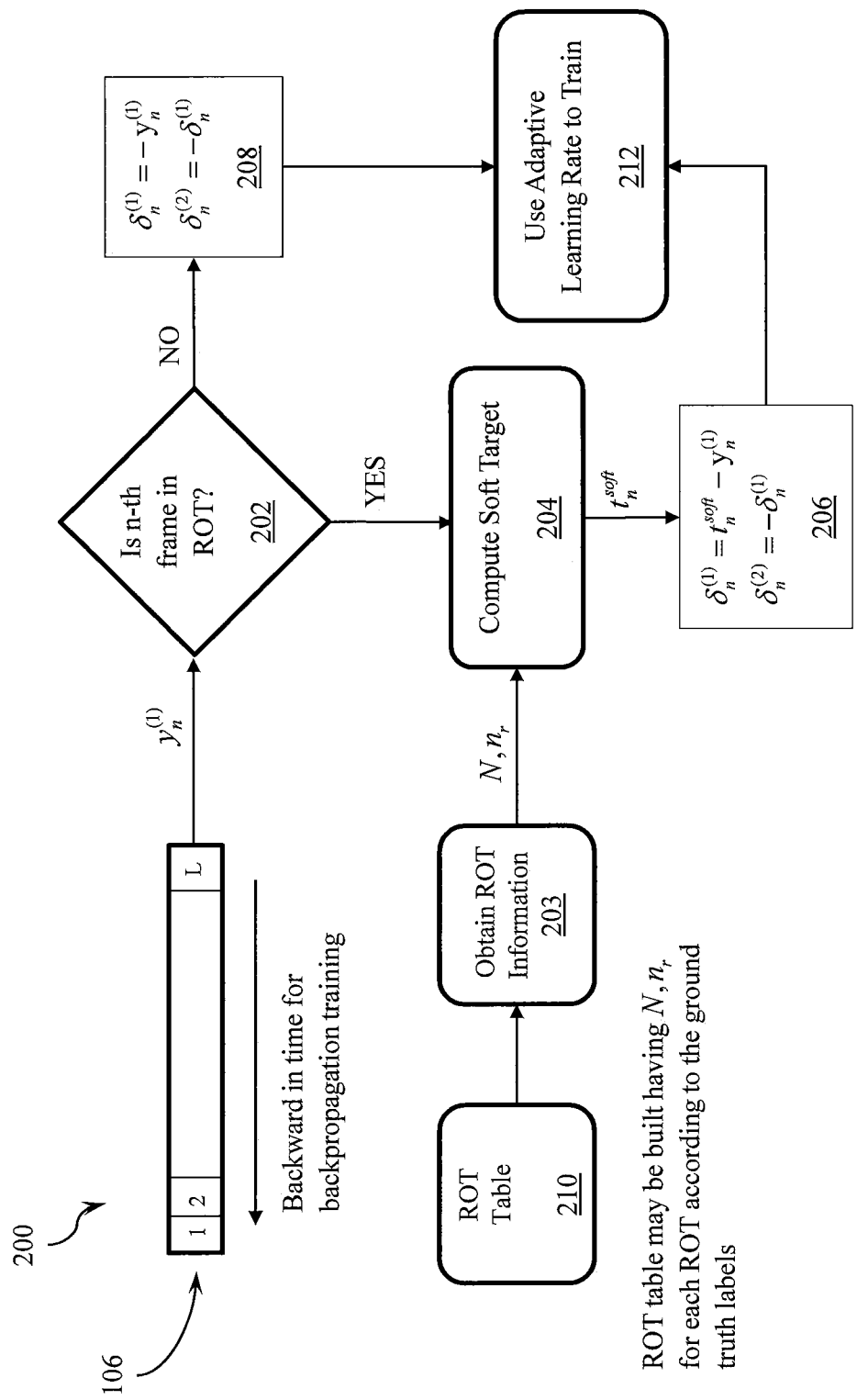
FIG. 2 illustrates an example binary classification system for performing a backward pass on training data to train an artificial neural network, in accordance with an embodiment.

Referring to FIGS. 1 and 2, an embodiment of a general structure of the proposed system and process to train a recurrent neural network, such as an LSTM network, for binary classification will now be described. Referring to FIG. 1, a forward pass process 100 will first be described. In the forward pass, network outputs at the first output node ($y_n^{(1)}$) for each frame of a sequence of training data are computed. The network 102 of the illustrated embodiment produces outputs 104 for all of the frames of the input sequence 108. The outputs are stored in a buffer 106. The backward pass starts from the last frame ($y_{L-1}^{(1)}$) and goes backward in time to compute the output error for each frame at the input of a softmax node ($\delta_n^{(1)}$). Then, the system propagates this error backwards through the unfolded net, using standard Back Propagation Through Time (BPTT) equations, such as disclosed in A. Graves and J. Schmidhuber, "Framewise phoneme classification with bidirectional LSTM and other neural network architectures", Neural Networks, vol. 18, pp. 602-610, 2005, which is incorporated herein by reference in its entirety.

An embodiment of the backward pass process 200 is illustrated in FIG. 2. In step 202, it is determined whether the current frame from the buffer 106 is in the Region of Target (ROT) or not. In one embodiment, the region in which the ground truth target is "one" is called the ROT. In step 208, if the current frame is not inside a ROT, then the output value is expected to be zero and the signal error ($\delta_n^{(1)}$) for each output is computed as shown in step 208 (e.g., $\delta_n^{(1)} = -y_n^{(1)}$). If the current frame is inside a ROT, then the signal error is obtained by as follows. First, in step 203, the ROT information associated with the current frame is obtained. In one embodiment, the ROT information is stored in a ROT table 210 built using the ground truth labeling of the training data, and the ROT information includes the length of the ROT (N) and the starting point of the ROT ($n_r$). Next, in step 204, the soft target ($t_n^{soft}$) is computed using the ROT information. In step 206, the signal error is calculated using the estimated soft target as it is shown in step 206 (e.g., $\delta_n^{(1)} = t_n^{soft} - y_n^{(1)}$).

In various embodiments, a binary classification network will have two output nodes if the output layer uses the softmax nonlinear function (if the logistic unit is used, the number of output node is one), and the ground truth label would be either zero or one. One goal is to train a recurrent neural network to generate outputs which are one in the ROT and zero anywhere else. But in some applications, such as keyword spotting, it may be sufficient to produce only one spike somewhere in the ROT and be zero anywhere else. For example, in a keyword spotting application, it is often desired to have a system that can detect the keyword by producing one spike close to the end of the keyword. In such a system, the ROT can be defined to cover the entire keyword (or at least the end of the keyword in some embodiments). In various embodiments, a goal is to build a system that can produce a spike (output close to one) anywhere in the ROT and generate zero anywhere else.

Figure 3:
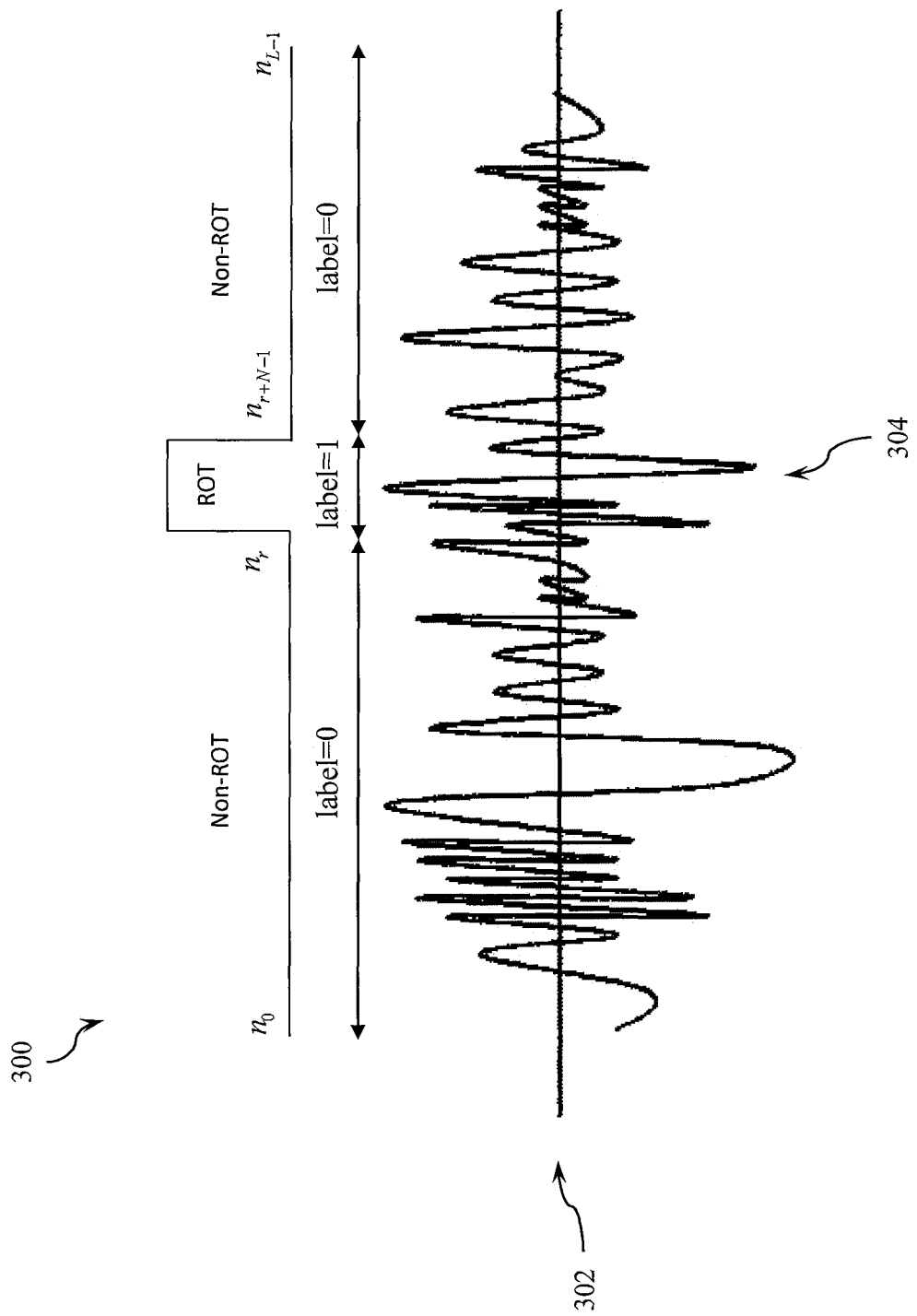
FIG. 3 illustrates example Region of Target Labeling with a sequence of input data, in accordance with an embodiment.

For example, FIG. 3 illustrates an example sequence of input data 300 with target labeling for training a recurrent neural network of the illustrated embodiment for binary classification. The input data 300 includes an audio sample 302, including a target keyword 304. The audio sample 302 is divided into a sequence of L frames having one Region of Target (ROT) of length N starting from frame $n_r$. The region from $n_r$ to $n_{r+N-1}$ is called the Region of Target (ROT) and includes frames including the target keyword 304 (or in some embodiments, the ending of the target keyword 304). The regions from $n=n_0$ to $n=n_r$ as well as from $n=n_{r+N-1}$ to $n=n_{L-1}$ are called non-ROT regions.

In some embodiments, one goal is to force the network to produce output close to one somewhere during the ROT from $n_r$ to $n_{r+N-1}$ and to be zero from $n_0$ to $n_r$ as well as from $n_{r+N-1}$ to $n_{L-1}$. To do so, a recurrent neural network such as LSTM or GRU may be used with two outputs having softmax non-linear function for the two output nodes. If we assume that the two outputs of the network before applying the non-linear function are $z_n^{(1)}$ and $z_n^{(2)}$ (where n is the time index), then the final outputs of the network ($y_n^{(1)}$ and $y_n^{(2)}$) using the softmax non-linear function can be obtained as follows:

$$y_n^{(1)} = \frac{e^{z_n^{(1)}}}{e^{z_n^{(1)}} + e^{z_n^{(2)}}} \quad (1)$$

$$y_n^{(2)} = \frac{e^{z_n^{(2)}}}{e^{z_n^{(1)}} + e^{z_n^{(2)}}}$$

To train the network, a cross-entropy cost function is used. Assume that $t_n$ is the ground truth (target value) at frame n, then the cross-entropy cost function for the two outputs may be defined as follows:

$$C(y_n^{(i)}, t_n) = -(t_n \log(y_n^{(1)}) + (1-t_n)\log(y_n^{(2)})) \quad i=1,2$$

$$y_n^{(2)} = 1 - y_n^{(1)} \quad (2)$$

As the output of the network ($y_n^{(1)}$) has value between zero and one, it can be treated as the probability of being in ROT at frame n. In other words, this can be translated as follows:

$y_n^{(1)} \rightarrow$ probability of being in ROT at frame n $y_n^{(2)} = 1 - y_n^{(1)} \rightarrow$ probability of being in non-ROT at frame n In one embodiment, the cross-entropy cost function maximizes the logarithm of the probability at frame n.

In order to train the network, which includes updating the weights and biases, a signal error ($\delta_n^{(i)}$, i=1, 2) received at each node of the output layer (i.e., $z_n^{(1)}$ and $z_n^{(2)}$) is computed. The signal error is propagated backwards through the unfolded net, using the standard BPTT as described above. The cost function derivative may be calculated as follows, which shows how to compute the derivative for the first node, $z_n^{(1)}$. The derivative for the second one, $z_n^{(2)}$, can be calculated similarly:

$$\frac{dC(y_n^{(i)}, t_n)}{dz_n^{(1)}} = -\delta_n^{(1)} = \frac{dC(y_n^{(i)}, t_n)}{dy_n^{(1)}} \times \frac{dy_n^{(1)}}{dz_n^{(1)}} + \frac{dC(y_n^{(i)}, t_n)}{dy_n^{(2)}} \times \frac{dy_n^{(2)}}{dz_n^{(1)}} \quad (3)$$

$$\frac{dy_n^{(1)}}{dz_n^{(1)}} = y_n^{(1)}(1 - y_n^{(1)})$$

$$\frac{dy_n^{(2)}}{dz_n^{(1)}} = -y_n^{(1)}(1 - y_n^{(1)})$$

The signal error using (3) can be obtained as follows:

$$\delta_n^{(1)} = t_n - y_n^{(1)}$$

$$\delta_n^{(2)} = -\delta_n^{(1)} \quad (4)$$

As it is mentioned above, in various embodiments a system to train a recurrent neural network, such as an LSTM network, for each sequence of training data has two parts: 1) a forward pass in which the network outputs for all the frames of the training sequence are generated using the current values of weights and biases of the network; and 2) backward pass in which updated weights and biases are computed and the network is updated backward in time. To compute the update of the weights and biases, the signal error as discussed above is computed and then the signal error is propagated backwards through the unfolded net from the output layer to the input layer using the standard BPTT. As illustrated in the embodiment of FIG. 2, the backward pass has two main steps. First, checking whether the current frame is in the ROT or not (step 202). Second, computing the error signal based on whether it is in ROT (steps 204, 206) or not (step 208). Embodiments of how to compute the error signal in ROT and non-ROT regions are further described below.

For non-ROT frames (step 208), the cross-entropy cost function in (2) is equal to maximizing the logarithm of the probability of being in a non-ROT at each frame. This is aligned with a goal of having zero outputs for all the frames of non-ROT regions. The error signal in this region can be computed using (4) as $$\delta_n^{(1)} = -y_n^{(1)}$$

$$\delta_n^{(2)} = -\delta_n^{(1)} \quad (5)$$

From now on, we drop n to show the frame index and so the network output at the first node for ROT of FIG. 2 is denoted by $y_r^{(1)}, \ldots, y_{r+N-1}^{(1)}$. The goal for frames in the ROT is different than the one in the non-ROT as discussed above. In this region, a goal is to force the network to generate one spike anywhere during this region instead of forcing it to give ones all the time. To do so, in one embodiment the system maximizes the logarithm of the probability of having a spike one-time during the ROT. This is called One Spike Connectionist Temporal Classification (OSCTC) cost function. To compute this cost function, the probability of having one spike during the ROT is first computed as $$P_{ROT} = \sum_{i=0}^{N-1} p_i \quad (6)$$

$$p_i = (1 - y_r^{(1)}) \times (1 - y_{r+1}^{(1)}) \times \ldots y_{r+i}^{(1)} \times \ldots (1 - y_{r+N-2}^{(1)}) \times (1 - y_{r+N-1}^{(1)})$$

The cost function in (2) is revised as $$C(y_n^{(i)}, t_n) = -\log(P_{ROT}) \quad (7)$$

Similar to (4), the signal error can be computed as $$\delta_n^{(1)} = -\frac{dC(y_n^{(i)}, t_n)}{dz_n^{(1)}} = (t_n^{soft} - y_n^{(1)}) \quad (8)$$

$$t_n^{soft} = \frac{p_{n-r}}{P_{ROT}}$$

$$\delta_n^{(2)} = -\delta_n^{(1)}$$

Instead of having $t_n$, which is the hard target value and equal to one in the ROT, $t_n^{soft}$ which is the soft target value is used in (8).

In various embodiments, calculating the $P_{ROT}$ or $P_n$ includes multiplication of small valued numbers ranging between zero and one. To avoid the problem of underflow, the multiplication may be carried in logarithmic domain in which multiplication is replaced with addition. An example embodiment of a procedure to compute $t_n^{soft}$ is set forth below:

For any ROT compute $P_{ROT}$ and $p_{n-r}$ ($r \leq n \leq r+N-1$) one time and keep the results $$\text{step 1) } \overline{P}^{LOG} = \sum_{i=0}^{N-1} \log(1 - y_{r+i}^{(1)}) \quad (9)$$

step 2) for all $n$ ($r \leq n \leq r+N-1$) compute $p_n^{LOG} =$ $$\overline{P}^{LOG} - \log(1 - y_n^{(1)}) + \log(y_n^{(1)})$$

step 3) for all $n$ ($r \leq n \leq r+N-1$) compute $p_n^{LOG} =$ $$p_n^{LOG} - \max_{n\{r \leq n \leq r+N-1\}} (p_n^{LOG})$$

step 4) for all $i$ ($i = n - r \Rightarrow 0 \leq i \leq N - 1$) compute $p_i = \exp(p_n^{LOG})$, $$\text{step 5) } P_{ROT} = \sum_{i=0}^{N-1} p_i$$

Now the soft target at n-th frame can be computed using the following step:

$$\text{step 6) } t_n^{soft} = \frac{p_{n-r}}{P_{ROT}}$$

It is possible to replace the softmax nonlinearity having two output nodes with a logistic nonlinearity which has one output node. The output of the network with logistic unit can be obtained as follows.

$$y_n^{(1)} = \frac{1}{1 + e^{-z_n^{(1)}}} \quad (10)$$

The signal error of the first node using the logistic unit is exactly the same as softmax unit which is given in (8)-(9).

It has been observed that the network training may converge more slowly than desired for certain implementations. To improve the performance and increase training convergence rate, an adaptive learning rate algorithm may be utilized (see step 212 in FIG. 2). In various embodiments, two different methods are used to update the weights and biases of the network. The weights and biases connected to the output layer may be updated according to the following rule for the t-th epoch:

$$X_{weight}(t) = m \times \Delta_{weight}(t-1) + \mu \times \delta_{weight}(t) \quad (11)$$

$$\Delta_{weight}(t) = \begin{cases} X_{weight}(t) & \text{if } \theta_{low}^{weight} \leq X_{weight}(t) \leq \theta_{up}^{weight} \\ \Delta_{weight}(t-1) & \text{otherwise} \end{cases}$$

$$\text{update} = \begin{cases} X_{weight}(t) & \text{if } \theta_{low}^{weight} \leq X_{weight}(t) \leq \theta_{up}^{weight} \\ 0 & \text{otherwise} \end{cases}$$

$$\text{weight}(t) = \text{weight}(t-1) + \text{update}$$

where m=0.9 is the momentum and µ=1e−3 is the learning rate, $\theta_{low}^{weight}$ and $\theta_{up}^{weight}$ are the lower bound and upper bound for the update of the weights (or the biases), and $\delta_{weight}(t)$ is the error signal which is received at the corresponding weights (or biases) using the standard BPTT. For example, for bias of the first node of the output layer, $\delta_{weight}(t)$ equals to $\delta_n^{(1)}$ for n-th frame. As shown in equation (11), the weights (or the biases) at each epoch are updated using update value. The following rule may be used to update other weights and biases of the network:

initialization for the first epoch→E(0)=0

$$E(t) = \rho \times E(t-1) + (1-\rho) \times (\delta_{weight}(t))^2 \quad (12)$$

$$RMS = \sqrt{E(t) + \varepsilon}$$

$$X_{weight}(t) = \frac{\mu}{RMS} \delta_{weight}(t)$$

$$update = \begin{cases} X_{weight}(t) & \text{if } \theta_{low}^{weight} \leq X_{weight}(t) \leq \theta_{up}^{weight} \\ 0 & \text{otherwise} \end{cases}$$

$$weight(t) = weight(t-1) + update$$

where $\rho=0.95$ is a smoothing factor and $\varepsilon=1e-6$ is a fixed constant to avoid infinity. The other parameters may be similar to what is discussed above.

Figure 4:
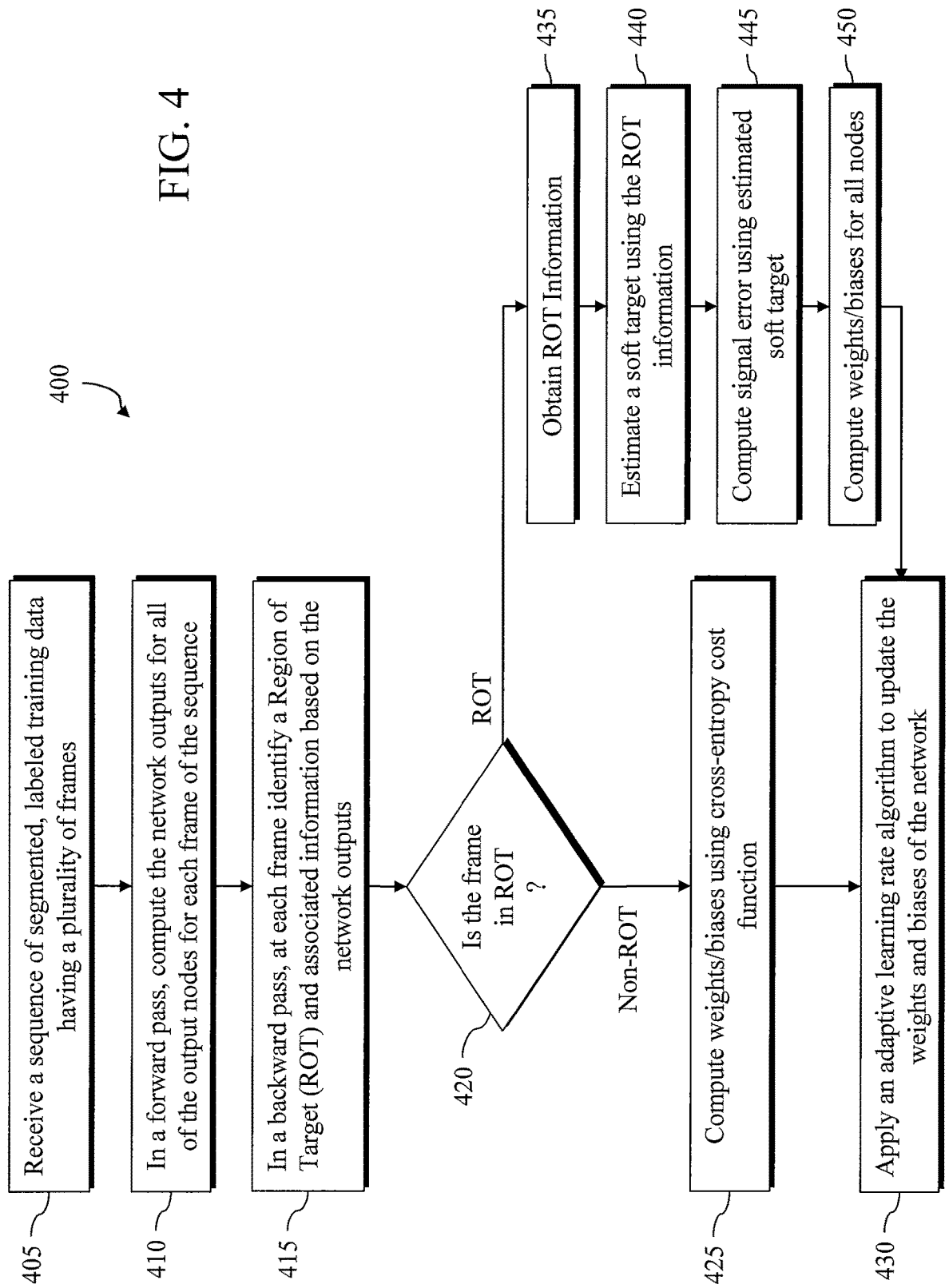
FIG. 4 is a flow diagram illustrating an example operation of binary classification training system, in accordance with an embodiment.

FIG. 4 is a flow chart illustrating an embodiment of a high-level training process 400 as discussed above. In step 405, the system receives a sequence of segmented, labeled training data having a plurality of frames. Next, in step 410, a forward pass process is conducted through the training data to compute the network outputs for all of the output nodes for each frame of the training sequence. A backward pass process is then initiated in step 415, including at each frame, identifying a ROT and associated information based on the network outputs. For each frame, a determination is made in step 420 whether the frame is in the ROT or a non-ROT region. If the frame is non-ROT, then weights and biases are updated using the cross-entropy cost function in step 425, and an adaptive learning rate algorithm is applied in step 430 to increase the rate of convergence of the neural network. Referring back to step 420, if the frame is in a ROT, then ROT information is obtained in step 435, a soft target is estimated in step 440, a signal error is computed using the estimated soft target in step 445, and the calculated signal error is used to compute weights and biases for all nodes in step 450.

Figure 5:
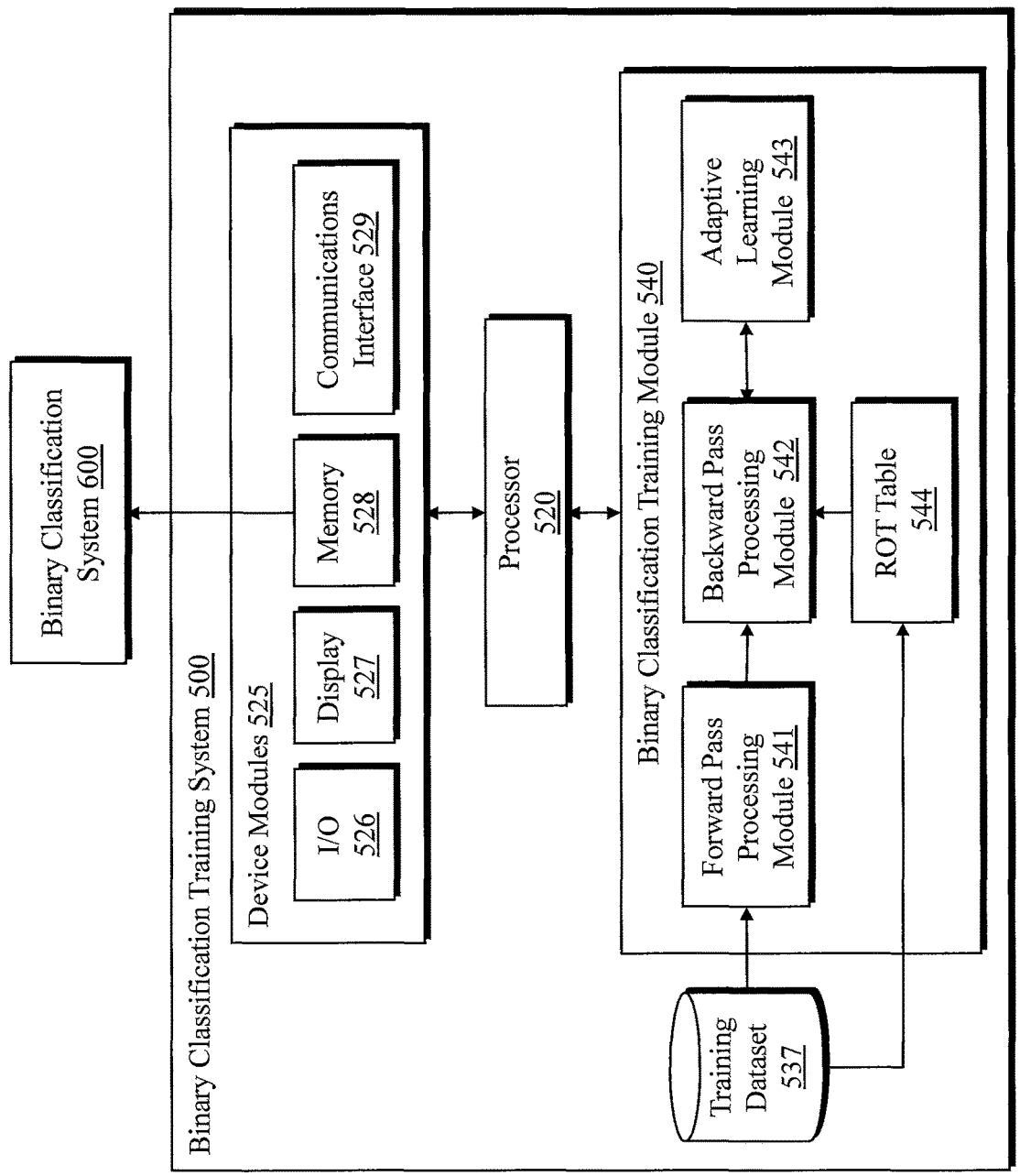
FIG. 5 is a block diagram illustrating binary classification training system, in accordance with an embodiment.

FIG. 5 illustrates an example binary classification training system 500 of some embodiments that performs at least part of the binary classification training process described above. The binary classification training system includes a training dataset 537 which contains the pre-segmented labeled training data. Training dataset 537 is connected to the binary classification training module 540 which includes ROT data (e.g., the ROT table 544). The ROT data is built using the information about the segmented training data provided by training dataset 537. The binary classification training module 540 also includes a forward pass processing module 541 programmed to perform the forward pass process described above and a backward pass processing module 542 programmed to perform the backward pass processes described above. The adaptive learning module 543 includes one or more adaptive learning algorithms that can be used by the backward pass processing module to update the weights and biases of a neural network, such as the LSTM network, as described above. In some of these embodiments, the binary classification training module 540 can iteratively perform the training processes using different training data to continuously improve and update the neural network. The binary classification training module 540 can store the updated neural network in the memory 528. The processor 520, can be a micro-controller, a digital signal processor (DSP), or other processing components, for controlling and facilitating the operations of the binary classification training system 500, including controlling communications with internal and external devices. The binary classification training system 500 further includes one or more communication channels such as a bus for facilitating communication of data between various components of the binary classification system 500. Components may include device modules 525 for providing device operation and functionality, which may include input/output components 526 such as a touch screen, keyboard, mouse, etc., a display 527 such as a monitor, a memory 528 such as RAM, solid state drive, disk drive, database, etc., and a communications interface 529. In some embodiments, the communications interface 529 may include a network interface (e.g., Ethernet interface) or a wireless transceiver for enabling the binary classification system to communicate with remote devices over a network. In operation, training of the neural network is performed by binary classification training system 500 offline and the trained model including the weights and biases of the neural network will be stored in binary classification system 600.

Figure 6:
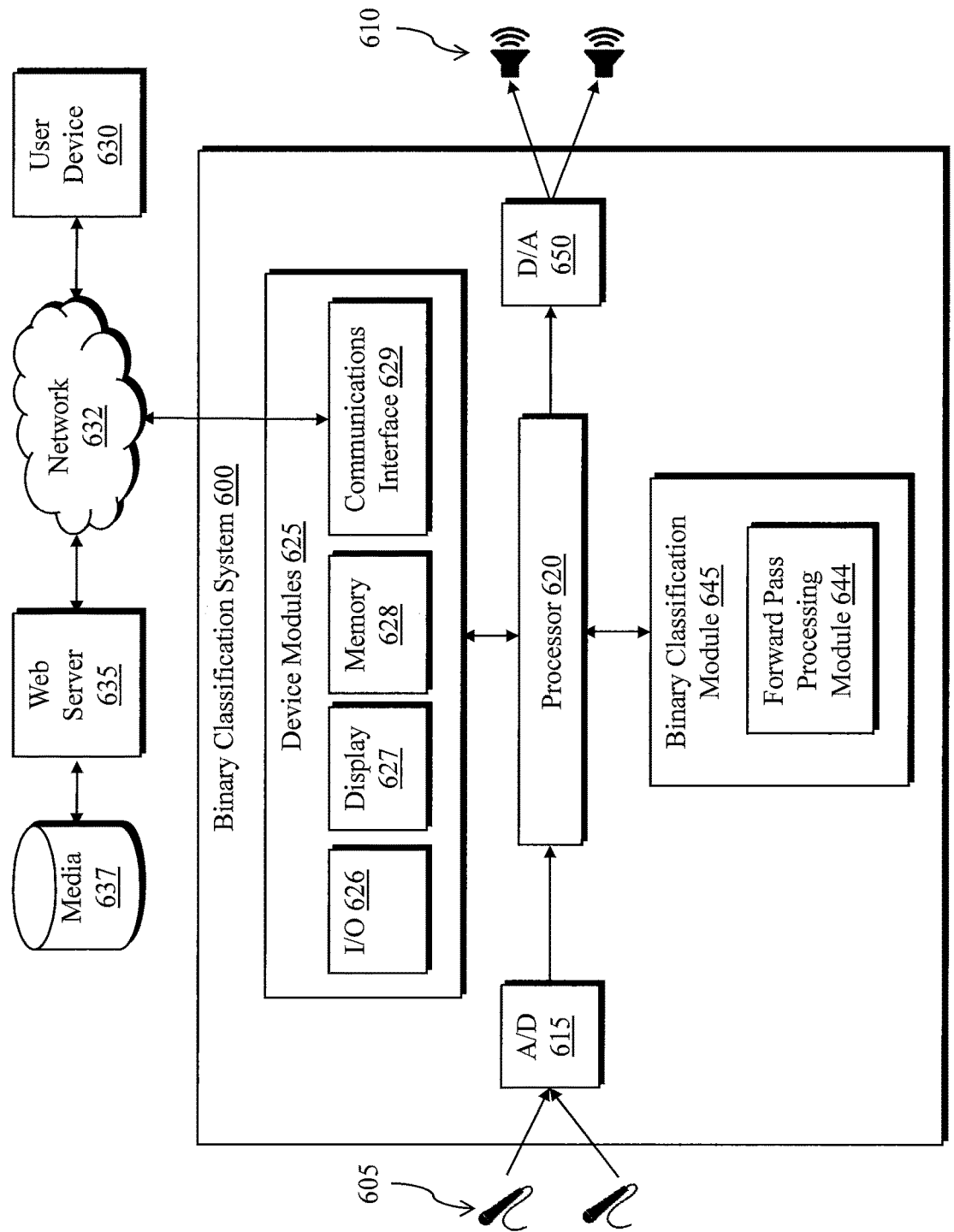
FIG. 6 is a block diagram illustrating a binary classification system, in accordance with an embodiment.

FIG. 6 illustrates an example binary classification system 600 of some embodiments that performs the binary classification process. The binary classification system 600 may be implemented as a mobile device, such as a smart phone or a laptop computer, a television or display monitor, a display computer, a computer server, an automobile, a speech recognition system, or any other device that provides audio keyword (e.g., commands) recognition capability. The binary classification system 600 is communicatively coupled with one or more audio inputting devices 605 such as a microphone and optionally also with one or more audio outputting devices 610 such as a loudspeaker.

In some embodiments, the binary classification system 600 can include an analog-to-digital converter 615 that converts the analog audio signals received from the audio inputting devices 605 into digital audio signals and sends the digital audio signals to processor 620, which can be a micro-controller, a digital signal processor (DSP), or other processing components, for controlling and facilitating the operations of the binary classification system 600, including controlling communications with internal and external devices. The binary classification system 600 may also include a digital-to-analog converter 650 that converts digital audio signals generated by the different modules and components of the binary classification system 600 to analog signals before transmitting the analog signals to the one or more audio outputting devices 610.

The binary classification system 600 includes one or more communication channels such as a bus for facilitating communication of data between various components of the binary classification system 600. Components may include device modules 625 for providing device operation and functionality, which may include input/output components 626 such as a touch screen, keyboard, mouse, etc., a display 627 such as a monitor, a memory 628 such as RAM, solid state drive, disk drive, database, etc., and a communications interface 629. In some embodiments, the communications interface 629 may include a network interface (e.g., Ethernet interface) or a wireless transceiver for enabling the binary classification system to communicate with remote devices over a network 632. Remote devices may include user devices 630 (e.g., household appliances, other user electronics, etc.), or a web server 635 that is communicatively coupled with a media storage 637.

The binary classification system 600 also includes a binary classification module 645 programmed to use the neural network that was trained and updated by the binary classification training system 500. The binary classification module 645 includes a forward pass processing module 644. In one embodiment, the forward pass processing module 644 is programmed to perform binary classification and prediction on audio input data received from audio inputting devices 605. In various embodiments, binary classification module 645 may include an automatic speech recognition (ASR) module providing voice command processing, an image search and classification system, an object detection system, medical diagnostic module, or other application configured for use with the neural network as described herein. As mentioned, for a given set of audio input data, the forward pass processing module 644 can produce either one of only two possible responses (e.g., a positive response or a negative response). Preferably, the forward pass processing module 644 can generate a response based on a neural network in real-time or close to real-time of the audio input.

In some embodiments, the binary classification module 645 can be programmed to output the response as an audio sound via the digital-to-analog converter 650 and the audio outputting devices 610. Instead of or in addition to producing and audio signal, the binary classification module 645 can be programmed to send a signal to an external device (e.g., to initiate an action or a transaction through the external device) based on the generated response. For example, the binary classification system 600 can be part of or communicatively coupled with a smart home system, and send a signal to a user device (e.g., a household appliance) via a network 632 (e.g., a local area network within the user's residence) based on the generated response (e.g., sending a signal to turn on the television based on the response generated by an audio input from the user). In another example, the binary classification system 600 can initiate a transaction with a web server 635 over the Internet based on the generated response (e.g., sending a signal to the web server 635 to purchase a movie stored in media storage 637 based on the response generated by an audio input from the user). The binary classification system disclosed herein is not limited to processing audio signals but can be used to train a neural network to process different input (e.g., image data, video data, etc.) as well.

Multi-Class Classification

In various embodiments, a novel One Spike Connectionist Temporal Classification (OSCTC) algorithm is proposed to train a recurrent neural network, such as an LSTM network, for multi-class classification, such as phoneme recognition.

Conventional recurrent neural networks (RNNs) can use internal memory to process arbitrary sequences of inputs. This makes RNNs suitable for tasks such as speech recognition since RNNs are able to model both the acoustic and temporal pattern of the input sequences. One approach for temporal classification with RNNs uses a Connectionist Temporal Classification (CTC) network, such as described in Graves, A., Fernandez, S., Gomez, F., Schmidhuber, J., "Connectionist temporal classification: labelling unsegmented sequence data with recurrent neural nets," Proceedings of the 23rd International Conference on Machine Learning, Pittsburgh-Pennsylvania (U.S.A.) (2006) (hereinafter, "Graves, et al."), which is incorporated herein by reference in its entirety. One idea behind CTC is that instead of generating a label as output from the neural network, a probability distribution is generated at every time step. This probability distribution may then be decoded into a maximum likelihood label. The network is then trained by creating an objective function that coerces the maximum likelihood decoding for a given sequence to correspond to a desired label.

Unlike the approach described above using RNN combined with HMM, CTC network models all aspects of the sequence with a single RNN and does not require the addition of an HMM to model the temporal pattern of the input sequence. The RNN may be trained directly for temporal classification tasks, which can be achieved by allowing the network to make label predictions at any point in the input sequence provided the overall sequence of labels is correct. Because CTC directly estimates the probabilities of the complete label sequences, external post-processing is not required to use the network as a temporal classifier.

Conventional systems, such as the system described in Graves et al., may include frame-wise and CTC networks classifying a speech signal. The system tracks probabilities of observing phonemes at particular times. The CTC network predicts the sequence of phonemes (typically as a series of spikes, separated by 'blanks', or null predictions), while the frame-wise network attempts to align the sequence of phonemes with temporal segmentation. The frame-wise network may receive an error or may misalign the segment boundaries, even if it predicts the correct phoneme. When one phoneme always occurs beside another, CTC tends to predict them together in a double spike. The choice of labeling can be read directly from the CTC outputs (follow the spikes), whereas the predictions of the frame-wise network must be post-processed before use.

Conventional CTC techniques for use in end-to-end Automatic Speech Recognition (ASR) face some obstacles such as the challenge of incorporating the lexicons and language models into decoding. It has been shown that combining the CTC network with another classifier can improve the performance of the ASR. For example, RNNs for Large Vocabulary Conversational Speech Recognition (LVCSR) trained with CTC can be improved with level minimum Bayes risk (sMBR) sequence training criterion and approaches the state-of-the-art performance. Despite the promising results obtained using the CTC technique, conventional approaches have several limitations including high computational complexity, unknown latency, and high amount of memory usage which is required to perform the forward-backward algorithm especially when the sequence of training is long.

Another approach is described in A. Graves, "Sequence transduction with recurrent neural networks," in ICML Representation Learning Worksop, 2012, which is incorporated herein by reference in its entirety. As disclosed, the RNN Transducer approach is an extension of the CTC algorithm. Unlike the CTC, which can be seen as an acoustic-only model, the RNN Transducer has another RNN that acts as a language model. Similar to the CTC, the probability of observing an output sequence for a given input is computed using the forward-backward algorithm and has similar limitations as other conventional approaches.

Conventional systems, such as the systems described herein, have several limitations and disadvantages for practical usage, which are overcome by the systems and methods disclosed herein. First, the CTC network of Graves does not use pre-segmented labeled training data. The embodiments described herein make use of all the information available from the training data to improve the performance of training. Thus, the present disclosure is suitable for speech recognition applications since pre-segmented labeled training data, such as the TIMIT dataset, is widely available. The embodiments disclosed here include solutions which utilize the information of pre-segmented labeled training data to improve the performance. While some conventional algorithms that use labeled training data may be sensitive to alignment errors, the embodiments disclosed herein are not sensitive to the exact alignment of the labels of the input data sequence. For example, the proposed method can use the word-level transcription of the data to train a model for phoneme recognition. As a result, the present disclosure provides a good solution to take the advantage of segmented data even where the labeling alignments are not exactly correct.

Another disadvantage of conventional approaches discussed herein is that the recursion algorithm for computing the forward and backward variables will eventually lead to underflows on a digital computer. Two well-known methods to avoid underflow are to either work in the log scale or to rescale the forward and backward variables. However, these two methods are less robust and can fail for very long sequences. The present disclosure includes embodiments that do not have this limitation, limiting computation on a Region of Target (ROT), which is slightly longer than the duration of a phoneme for the speech recognition task. The recursive computations of forward and backward variables further add computational complexity to the CTC network. The system disclosed herein includes a more computationally efficient approach which is more suitable for training a large data sizes.

In many approaches, the memory requirements for training the CTC network is directly related to the input sequence length. This is because for each input sequence the forward pass will be performed to obtain the network's outputs for the entire sequence based on the network's outputs. Also, forward and backward variables of the same length as the input sequence are computed. However, in the present disclosure, after computing the forward pass for the entire sequence, it computes the soft targets for the ROT, which has much shorter length than the entire sequence. Therefore, the method proposed herein is more suitable for practical applications especially when parallel training is conducted.

The CTC network proposed in Graves interprets the network outputs as a probability distribution over all possible label sequences, conditioned on a given input sequence. Given this distribution, an objective function is derived to directly maximize the probabilities of the correct labeling. In contrast, the methods disclosed herein will force the network to spike only one-time for each detection and they are designed so that the most probable path will correspond to the most probable labeling. The decoder of the method is relatively simple and highly computationally efficient compared to conventional approaches.

For tasks where segmentation is required (e.g. protein secondary structure prediction), it would be problematic to use a conventional CTC network such as described herein since there is no guarantee that the network prediction would be aligned with the corresponding part of the sequence. On the other hand, the method disclosed herein can solve this problem since it would preserve the alignment of the network prediction. Finally, there is no control on the latency of the conventional CTC algorithms discussed above, which may result in a trained system having unreasonably high latency. In contrast, the methods disclosed herein define a Region of Target (ROT) in a way that avoids this latency problem.

Figure 7:
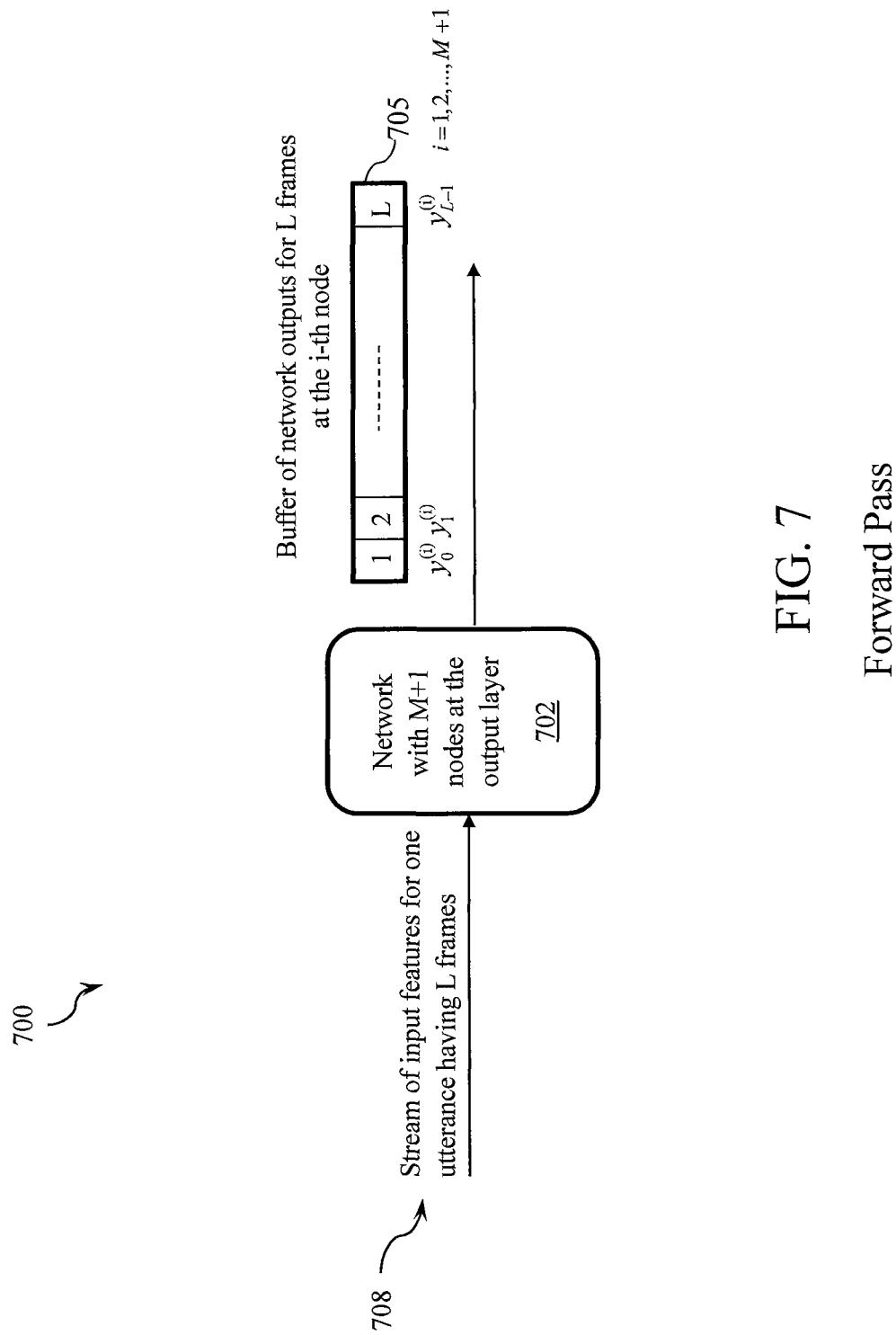
FIG. 7 illustrates a multi-class classification system for performing a forward pass on training data to train an artificial neural network, in accordance with an embodiment.
Figure 8:
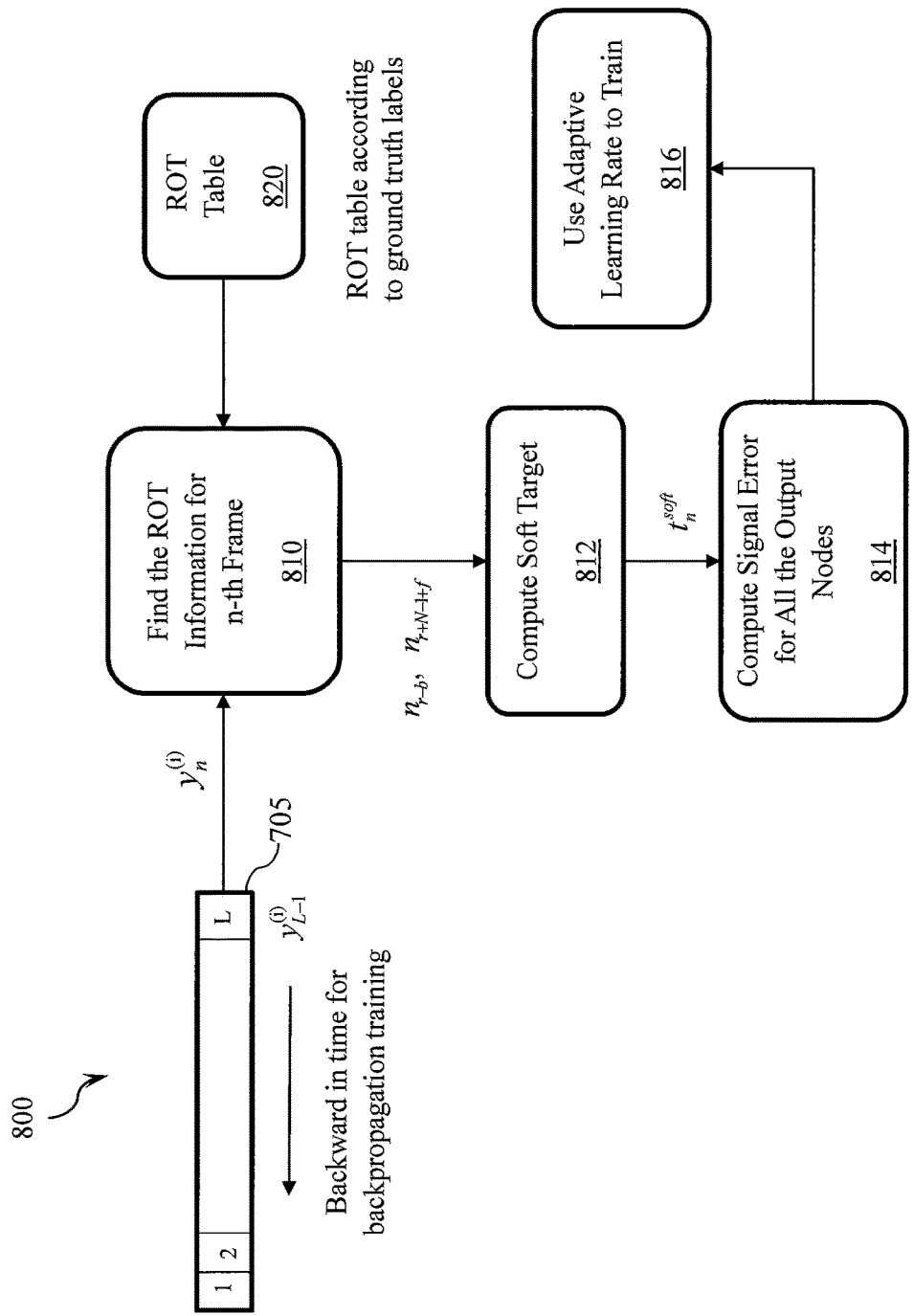
FIG. 8 illustrates a multi-class classification system for performing a backward pass on training data to train an artificial neural network, in accordance with an embodiment.

Referring to FIGS. 7 and 8, an embodiment of a system to train a network 702 for a classification application, such as phoneme recognition, will now be described. In the Forward Pass 700 (FIG. 7), the network outputs for all of the output nodes ($y_n^{(i)}$, i=1, . . . , M+1), for each frame of a sequence of training data 708, are computed, where M is the number of classes of phonemes. The network outputs for all the frames of the sequence are stored in a buffer 705.

In the Backward Pass 800 (FIG. 8), the system starts from the last frame ($y_{L-1}^{(i)}$) and goes backward in time to compute the signal error for each frame at the input of the softmax node ($\delta_n^{(i)}$) This error is propagated backwards through the unfolded network, for example, by using the standard Back Propagation Through Time (BPTT) equations as disclosed in A. Graves and J. Schmidhuber, "Framewise phoneme classification with bidirectional LSTM and other neural network architectures", Neural Networks, vol. 18, pp. 602-610, 2005, which is incorporated herein by reference in its entirety.

In various embodiments, the backward pass includes the following steps. In step 810, at each frame, the Region of Target (ROT) is determined, using information retrieved from the ROT table 820, which may be implemented as a table or other data structure. The beginning and the end of this region is used to compute the signal error. The soft target is computed in step 812 using the ROT information from step 810 and the network outputs. In step 814, the signal error is computed based on the network outputs and the estimated soft target. Finally, an adaptive learning rate algorithm is used to update the weights and biases of the network in step 816.

In the present embodiment, it is assumed that the total number of classes (total number of phonemes for speech recognition task) is M and the m-th unnormalized output of the network before applying the non-linear function (here it is softmax function) is $z_n^{(m)}$ (n is the frame index), then the final outputs of the network can be obtained as follows:

$$y_n^{(m)} = \frac{e^{z_n^{(m)}}}{\sum_{i=1}^{M} e^{z_n^{(i)}}}, m = 1, \ldots, M \tag{13}$$

Similarly, if the nonlinear function is logistic unit, the outputs of the network can be obtained as follows:

$$y_n^{(m)} = \frac{1}{1 + e^{-z_n^{(m)}}}, m = 1, \ldots, M \tag{14}$$

For a phoneme recognition application, each frame belongs to one of M classes of phonemes. Assume $t_n^{(m)}$ is the target value of the network at frame n for m-th output node of the network, then this value is one when frame n belongs to the m-th class of phoneme and it would be zero for all other nodes. For frame-wise training, the cross-entropy cost function may be used for training the network. The cross-entropy cost function is defined as follows:

$$C(y_n^{(m)}, t_n^{(m)}) = -\sum_{m=1}^{M} t_n^{(m)} \log(y_n^{(m)}) \tag{15}$$

In order to train the network and update the weights and biases, the signal error ($\delta_n^{(m)}$) is computed, which is the error that is received at each node of the output layer before applying the nonlinear function. The cost function derivative is calculated as follows (the derivative is only computed for the first node, $z_n^{(1)}$ and the derivative for others can be done similarly):

$$\frac{dC(y_n^{(m)}, t_n^{(m)})}{dz_n^{(1)}} = \tag{16}$$

$$-\delta_n^{(m)} = \frac{dC(y_n^{(m)}, t_n^{(m)})}{dy_n^{(1)}} \times \frac{dy_n^{(1)}}{dz_n^{(1)}} + \ldots \frac{dC(y_n^{(m)}, t_n^{(M)})}{dy_n^{(2)}} \times \frac{dy_n^{(M)}}{dz_n^{(1)}}$$

$$\frac{dy_n^{(1)}}{dz_n^{(1)}} = y_n^{(1)}(1 - y_n^{(1)})$$

$$\frac{dy_n^{(i)}}{dz_n^{(1)}} = -y_n^{(1)}(1 - y_n^{(1)}) \; i = 2, \ldots, M$$

By using equations (13)-(16), the signal error at the output nodes can be obtained as follows:

$$\delta_n^{(m)} = -\frac{dC(y_n^{(m)}, t_n^{(m)})}{dz_n^{(1)}} = (t_n^{(m)} - y_n^{(m)}) \tag{17}$$

In various embodiments, frame-wise training using (17) may force the network to predict the phoneme in the entire duration of the phoneme for all frames. It is desirable to train the network to predict a phoneme after it sees the entire duration of the phoneme including the transitions, because the phonemes may have similar temporal-spectral characteristic at the initial parts but unique characteristic when considering the entire duration of the phoneme. As a result, it is often desirable to force the network to predict a phoneme almost at the end of it. The frame-wise training using (17) may also force the network to have the outputs aligned to the ground-truth labeling. However, this alignment may not be correct due to the mistakes in the ground-truth labeling and the exact correct labeling is not always available.

Next, changing the cost function in (15) and the signal error in (17) to obtain the proposed OSCTC algorithm that can solve the problems described above will be described. As previously explained, the present embodiment trains the network (which may be an LSTM network) for each sequence of training data with two main steps: 1) a Forward Pass through the training sequence in which network outputs for each of the frames of the training sequence are generated using the current values of weights and biases of the network; and 2) a Backward Pass in which the update of the weights and biases are computed and the network is updated backward in time. To compute the update of the weights and biases, the signal error as discussed above is computed and then the signal error is propagated backwards through the unfolded network from the output layer to the input layer using the standard BPTT. As illustrated in FIG. 8, backward pass training at each frame has four steps: 1) Find the ROT Information, 2) Compute the soft target, 3) Compute the signal error for all the output nodes, and 4) Use the adaptive learning rate to train the network. Each of these steps will be discussed in detail below.

Find the ROT Information for n-Th Frame (Step 810, FIG. 8)

Assume that the number of classes or phonemes is M, then the proposed OSCTC algorithm with softmax nonlinearity has M+1 output nodes and it has M output nodes for logistic nonlinearity for the output layer of the LSTM network. The one additional node for softmax nonlinearity is called a blank node, but the blank node is not required if the logistic unit is selected. In the present embodiment, the algorithm to compute the signal error of each frame is based on a region that is called Region of Target (ROT). This region is defined as a region that includes all the frames corresponding to the target label of that frame plus some additional frames near the two boundaries (on the left and right) sufficient to include the transitions.

Figure 9:
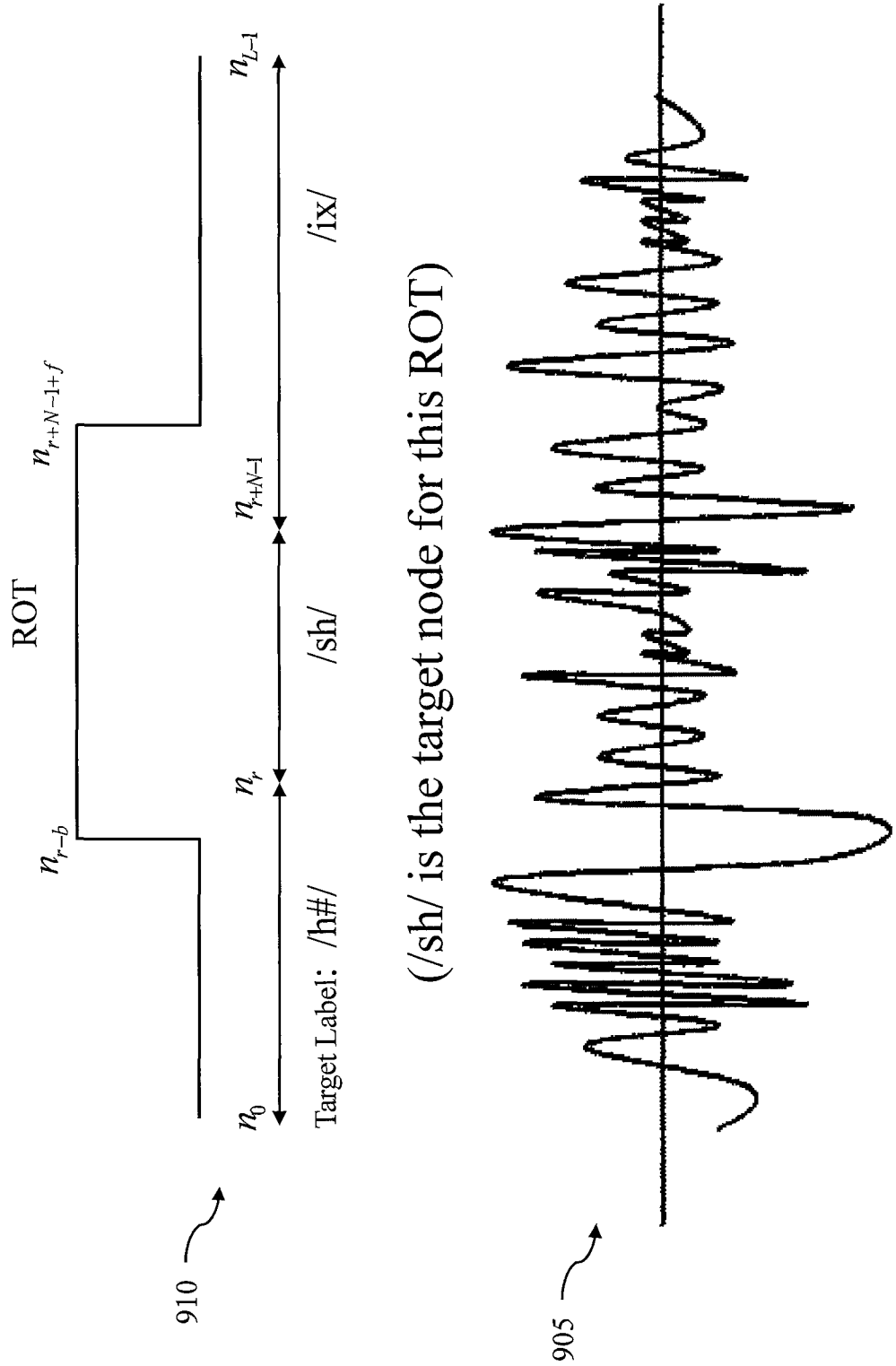
FIG. 9 illustrates example Region of Target Labeling with an example sequence of input data, in accordance with an embodiment.

An example of ROT labeling is illustrated in FIG. 9. As illustrated, an example input in the form of an audio waveform 905 is provided and divided into a sequence of audio frames 910 (e.g., n number of frames in order). An input sequence including three target labels is shown, namely, the three phonemes of TIMIT "h #", "sh", and "ix". The first target label ("h #") is from frame $n_0$ until $n_r$, the second target label ("sh") is from frame $n_r$ until $n_{r+N-1}$ and the third one ("ix") is from frame $n_{r+N-1}$ until $n_{L-1}$. To compute the signal error for the n-th frame where $n_r \le n < n_{r+N-1}$, the ROT for this current frame is defined to be from frame $n_{r-b}$ until $n_{r+N-1+f}$, where b and f are the backward and forward offset number of frames to let the ROT cover the transition from previous phoneme ("h #") and the transition to the next phoneme ("ix"). In this example, ("sh") is the target node of a recurrent neural network such as LSTM or GRU for this ROT. In one embodiment, the value of f depends on the latency requirement of the system. For example, if the latency of the system is zero, then f=0. However, it is often desirable to include the transitions (both forward and backward) in the ROT (e.g., b≠0, f≠0) since this can help the network to better classify the phonemes. In the case where the labeling alignment has some errors, the ROT can be defined in a bigger region to include the neighbor phonemes on the right and on the left. By setting a larger ROT, labeling errors in the training data are addressed because the larger ROT should include all the frames of target label (here "sh"). In the present embodiment, having a larger ROT that includes other phonemes as well is not a problem. In this manner, the algorithm is not sensitive to the labeling errors in the training data.

Compute the Soft Target (Step 812, FIG. 8)

As mentioned above with respect to step 810, the number of output nodes for the softmax layer is M+1. Thus, the softmax outputs in (12) are modified as:

$$y_n^{(m)} = \frac{e^{z_n^{(m)}}}{\sum_{i=1}^{M+1} e^{z_n^{(i)}}}, m = 1, \ldots, M+1 \tag{18}$$

In one embodiment, a goal of OSCTC cost function is to force the network to predict the correct label (here "sh") one time at any frame during the ROT (ROT frames include $n_{r-b}$<frame index<$n_{r+N-1+f}$) and set the other frames of the ROT as the blank label or make the output of all nodes to be zero in the case of using logistic unit. In this example, "sh" is the target node which is assumed to be the k-th node of the output layer. From now on, we drop n to show the frame index and so the network output at k-th node for ROT of FIG. 8 is denoted by $y_{r-b}^{(k)}, \ldots, y_{r+f+N-1}^{(k)}$. In this example, the ROT length of N+f+b and k-th node of the output layer should be close to one at any frame during the ROT. Thus, the probability of having one-time prediction during the ROT of FIG. 8 when there is no overlap between the ROT of adjacent target nodes (here "sh" and "h #") is given below ($\tilde{M}=M+1$ for softmax output layer and $\tilde{M}=M$ for logistic output layer):

$$P_{ROT} = \sum_{i=0}^{N+f+b-1} P_i \tag{19}$$

$$P_i = y_{r-b+i}^{(k)} \prod_{\substack{j=0 \\ j \neq i}}^{N-1+b+f} \left(1 - y_{r-b+j}^{(k)}\right) \times \prod_{\substack{s=1 \\ s \neq k}}^{\tilde{M}} (1 - y_{r-b+i}^{(s)})$$

In above equation, it is assumed that the probability of having one spike in ROT for target node at frame n depends not only on the output of target node ($y_n^{(k)}$) but it also depends on the output of other nodes ($y_n^{(s)}$, $s=1, \ldots, \tilde{M}$, $s \neq k$). To reduce the computational complexity especially when the number of classes is high, it is better to assume independency between the target node and the other nodes. So the above equation for $p_i$ can be modified as follows (the dependency on other nodes is removed):

$$P_i = y_{r-b+i}^{(k)} \prod_{\substack{j=0 \\ j \neq i}}^{N-1+b+f} \left(1 - y_{r-b+j}^{(k)}\right) \tag{20}$$

The soft target of ROT at n-th frame ($t_n^{ROT}$) is defined as follows:

$$t_n^{soft} = \frac{p_{n-r+b}}{P_{ROT}} \tag{21}$$

In the present embodiment, calculating $P_{ROT}$ and $P_n$ requires some multiplications of small valued numbers ranging between zero and one, which may lead to underflow. To address this problem, in one embodiment the multiplication is carried in logarithmic domain (in the logarithmic domain, multiplication is replaced by addition).

For any ROT, compute $P_{ROT}$ and $p_{n-r+b}$ ($r-b \leq r \leq r+N-1+f$) one time and keep the results.

k is assumed to be the target node in the ROT $$\text{step 1) } \overline{P}_{LOG} = \sum_{i=0}^{N+b+f-1} \log(1 - y_{r-b+i}^{(k)}), \tag{22}$$

step 2) for all $n$ ($r - b \leq n \leq r + N - 1 + f$) compute $p_n^{target} =$
$$p_n^{preceding} + p_n^{suceeding} -$$
$$\log(1 - y_n^{(k)}) + \log(y_n^{(k)}) + p_{n,k}^{Not},$$

step 3) for all $n$ ($r - b \leq n \leq r + N - 1 + f$) compute $p_n^{LOG} =$
$$\overline{P}_{LOG} + p_n^{target},$$

step 4) for all $n$ ($r - b \leq n \leq r + N - 1 + f$) compute $p_n^{LOG} =$
$$p_n^{LOG} - \max_{n\{r-b \leq n \leq r+f+N-1\}} (p_n^{LOG}),$$

-continued step 5) for all $i$ ($i = n - r + b \Rightarrow 0 \leq i \leq N + b + f - 1$)
$$\text{compute } p_i = \exp(p_n^{LOG}),$$

step 6) compute $P_{ROT} = \sum_{i=0}^{N+b+f+1} p_i$

Now the soft target at n-th frame can be computed using the following steps.

$$\text{step 7) } t_n^{soft} = \frac{p_{n-r+b}}{P_{ROT}}$$

If the ROT of adjacent phonemes does not overlap (f=b=0), then $p_n^{preceding} = p_n^{suceeding} = 0$. This is true when the alignments of segmented data are correct. $p_{n,k}^{Not}$ is the log probability of having no spike at frame n for all nodes except node k. According to (19), $$p_{n,k}^{Not} = \sum_{\substack{s=1 \\ s \neq k}}^{\tilde{M}} \log(1 - y_n^{(s)})$$

where $\tilde{M}=M+1$ for softmax output layer and $\tilde{M}=M$ for logistic output layer. To reduce complexity, this term can be ignored using (20), e.g., $p_{n,k}^{Not}=0$.

Compute Signal Error for all the Output Nodes (Step 814, FIG. 8)

In this section, modifications to the cost function of (15) and the signal error of (17) are discussed in accordance with an embodiment of the disclosure. In one embodiment, the cost function includes two different cost functions for two different sets of output nodes of the network. Referring to the example in FIG. 9, "sh" is the k-th node of the output layer (target node) and the blank node is the last node (M+1-th node) for softmax nonlinearity. The cost function for these two nodes is called the OSCTC cost function, and the cost function for all other nodes is the cross-entropy cost function similar to equation (13).

Signal Error for all Other Nodes Except the Target Node and Blank Node

In the present embodiment, the cost function for all other nodes except the target node and the blank node is cross entropy similar to equation (13) and so the signal error for these nodes can be computed using equation (15). As the target value for all these nodes is zero ($t_n^{(m)}=0$ if $1 \leq m \leq M$ and $m \neq k$), the signal error for these nodes can be computed as:

$$\delta_n^{(m)} = -y_n^{(m)} \text{ if } 1 \leq m \leq M \text{ and } m \neq k \tag{23}$$

OSCTC Cost Function and Signal Error for Target Node and Blank Node

The proposed OSCTC cost function is defined as follows:

$$C(y_n^{(m)}, t_n^{(m)}) = -\log(P_{ROT}) \tag{24}$$

Similar to (15), the derivative for the k-th node with respect to $z_n^{(k)}$ can be obtained as:

$$\delta_n^{(k)} = -\frac{dC(y_n^{(m)}, t_n^{(m)})}{dz_n^{(k)}} = (t_n^{soft} - y_n^{(k)}) \tag{25}$$

where $\delta_n^{(k)}$ is the signal error for k-th node at n-th frame for the ROT as depicted in FIG. 2. So, the signal error for the blank node ((M+1)-th node) of the softmax output can be computed as follows:

$$\delta_n^{(M+1)} = (1 - t_n^{soft} - y_n^{(M+1)}) \qquad (26)$$

Please note that the signal error for blank node is only required for softmax output layer as it is indicated in (13).

Example OSCTC Cost Function if the ROT has Overlap with Adjacent ROT

In this section, an example method in accordance with one embodiment is described in case there is overlap between adjacent ROTs. This can happen when the alignment for labeled data is not accurate or there is no phoneme-level or word-level transcription with alignment. The proposed method can still use this data to train a model by making the ROTs of different classes to have overlaps. If the n-th frame falls in the non-overlap region, then the above method can be used to estimate the signal error for all the nodes. However, if the n-th frame falls in the overlap region of more than one ROTs, then the probability of having one-time prediction during all the ROTs is considered. It is assumed that the target label corresponding to node k at the current frame n belongs to a ROT that has overlap region with ROTs of the preceding labels and succeeding labels.

We define the set of nodes related to the preceding labels for target node k at frame n as $P_n^k$ and the set of nodes related to the succeeding labels for target node k at frame n as $S_n^k$. For example, according to FIG. 9, the target label "sh" has preceding label "h #" and succeeding label "ix". So $P_n^k$ contains the node index of "h #" and $S_n^k$ contains the node index of "ix". The ROT of each node index $s \in P_n^k$ or $S_n^k$ (ROT$_s$) has overlap region with the ROT of target node k (ROT$_k$) and the overlapping region is called ROT$_{sk}$. The first and the last frame in this overlapping region ROT$_{sk}$ are assumed to be $F_{sk}$ and $L_{sk}$, respectively. According to (22), the soft target at n-th frame $t_n^{soft}$ can be computed using 7 steps. In case there is overlap between adjacent ROTs, step 2 can be modified as follows.

step 2) for all $n (r - b \le n \le r + N - 1 + f)$ compute $p_n^{target} =$ (27)

$$p_n^{preceding} + p_n^{suceeding} - \log(1 - y_n^{(k)}) + \log(y_n^{(k)}) + p_{n,k}^{Not},$$

$$p_n^{preceding} = \sum_{s \in P_n^k} \sum_{m=n}^{L_{sk}} \log(1 - y_m^{(s)})$$

$$p_n^{suceeding} = \sum_{s \in S_n^k} \sum_{m=F_{sk}}^{n} \log(1 - y_m^{(s)})$$

Proposed Adaptive Learning Rate (Step 816, FIG. 8)

The training the network of the present embodiment may converge too slowly for many applications. In order to improve the performance and increase the training convergence rate, an adaptive learning rate algorithm is utilized. In one embodiment, two different methods are used to update the weights and biases of the network. The weights and biases connected to the output layer are updated according to the following rule for t-th epoch:

$$X_{weight}(t) = m \times \Delta_{weight}(t-1) + \mu \times \delta_{weight}(t) \qquad (27)$$

$$\Delta_{weight}(t) = \begin{cases} X_{weight}(t) & \text{if } \theta_{low}^{weight} \le X_{weight}(t) \le \theta_{up}^{weight} \\ \Delta_{weight}(t-1) & \text{otherwise} \end{cases}$$

$$update = \begin{cases} X_{weight}(t) & \text{if } \theta_{low}^{weight} \le X_{weight}(t) \le \theta_{up}^{weight} \\ 0 & \text{otherwise} \end{cases}$$

$$weight(t) = weight(t-1) + update$$

where m=0.9 is the momentum and μ=1e−3 is the learning rate, $\mu_{low}^{weight}$ and $\theta_{up}^{weight}$ are the lower bound and upper bound for the update of the weights (or the biases), and $\delta_{weight}(t)$ is the error signal which is received at the corresponding weights (or biases) using the standard BPTT. For example, for bias of the first node of the output layer, $\delta_{weight}(t)$ equals to $\delta_n^{(1)}$ for n-th frame. As shown in (26), the weights (or the biases) at each epoch are updated using update value. For other weights and biases of a recurrent neural network such as LSTM or GRU, the following rule may be used to update them in accordance with one embodiment:

initialization for the first epoch→E(0)=0

$$E(t) = \rho \times E(t-1) + (1-\rho) \times (\delta_{weight}(t))^2 \qquad (28)$$

$$RMS = \sqrt{E(t) + \varepsilon}$$

$$X_{weight}(t) = \frac{\mu}{RMS} \delta_{weight}(t)$$

$$update = \begin{cases} X_{weight}(t) & \text{if } \theta_{low}^{weight} \le X_{weight}(t) \le \theta_{up}^{weight} \\ 0 & \text{otherwise} \end{cases}$$

$$weight(t) = weight(t-1) + update$$

where ρ=0.95 is a smoothing factor and ε=1e−6 is a fixed constant to avoid infinity. The other parameters are similar to what is discussed above.

Figure 10:
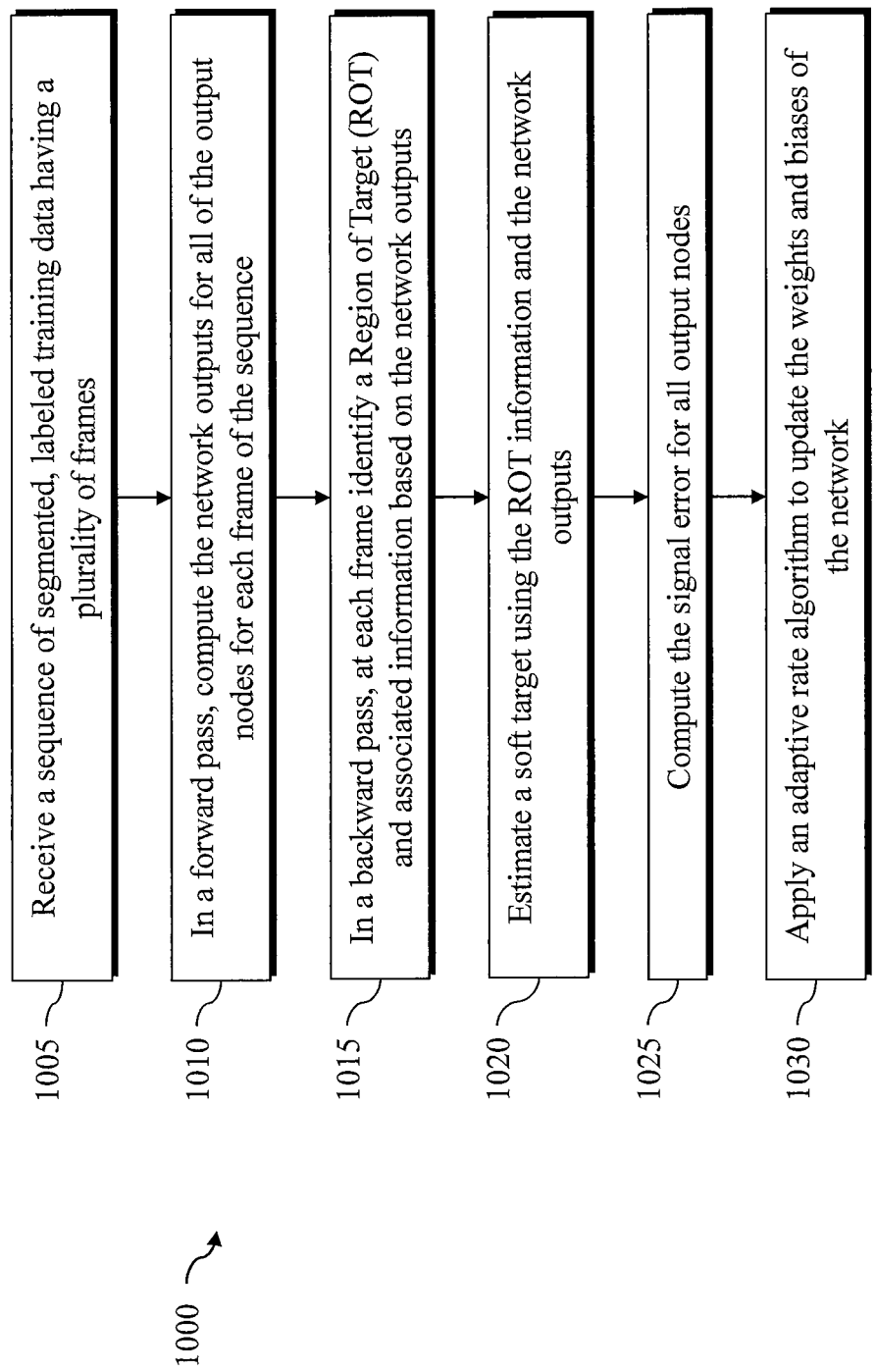
FIG. 10 is a flow diagram illustrating an example operation of multi-class classification training system, in accordance with an embodiment.

FIG. 10 is a flow chart illustrating an embodiment of a high-level training process 1000 as discussed above. In step 1005, the system receives a sequence of segmented, labeled training data having a plurality of frames. Next, in step 1010, a forward pass process is conducted through the training data to compute the network outputs for all of the output nodes for each frame of the training sequence. A backward pass process is then initiated in step 1015, including at each frame, identifying a ROT and associated information based on the network outputs. In step 1020, soft targets are estimated using the ROT information and the network outputs. The signal error for all output nodes is calculated in step 1025. Finally, in step 1030, an adaptive rate algorithm is applied to update the weights and biases of the network.

Figure 11:
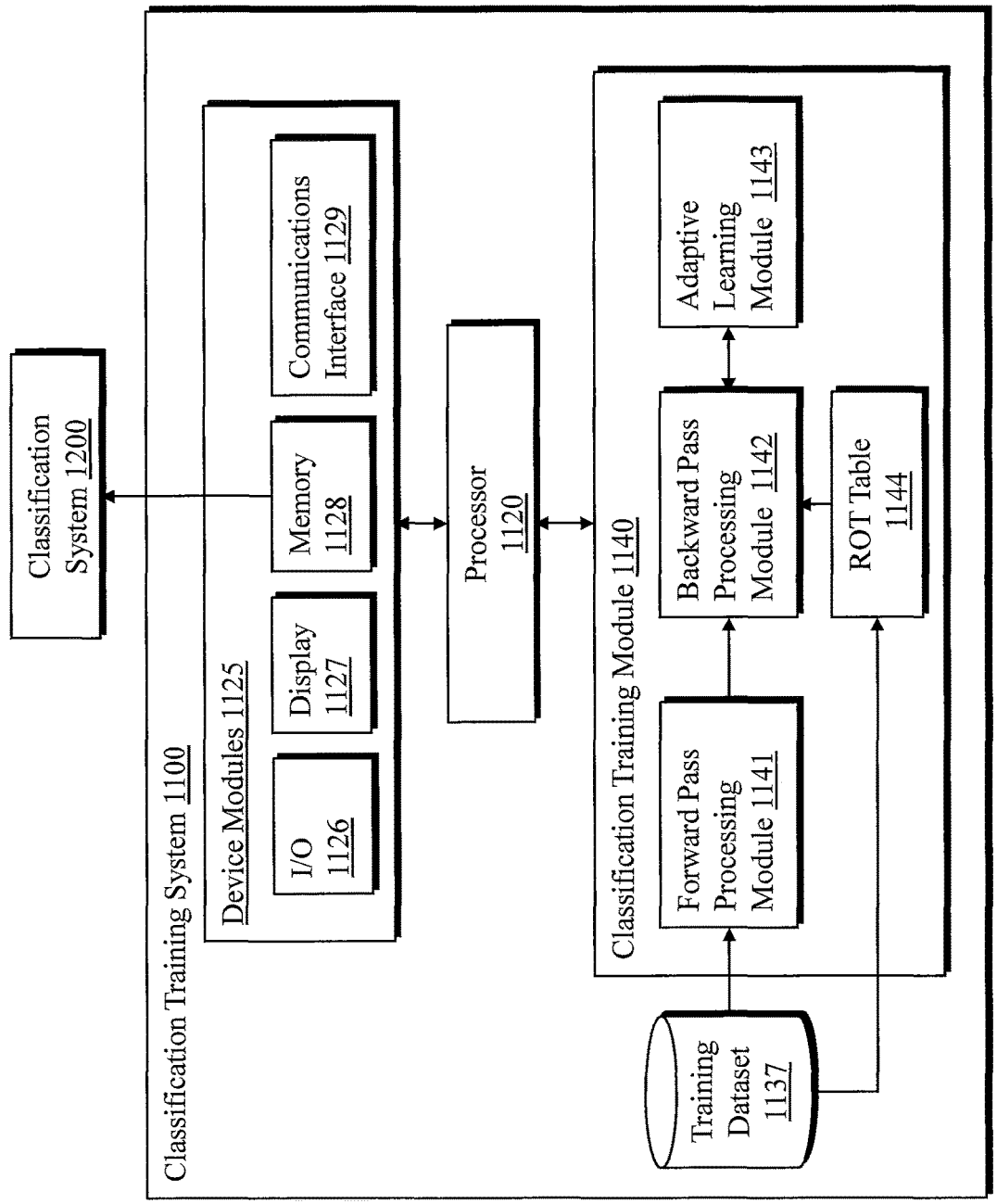
FIG. 11 is a block diagram illustrated a multi-class classification training system, in accordance with an embodiment.

FIG. 11 illustrates an example classification training system 1100 of some embodiments that performs at least part of the classification training process described above. The classification training system 1100 is programmed to perform the training processes described above. The classification training system includes the training dataset 1137 which contain the pre-segmented labeled training data. Training dataset 1137 is connected to the classification training module 1140 which includes ROT data, such as the ROT table 1144. The ROT table is built using the information about the segmented training data provided by training dataset 1137. The classification training module 1140 also includes a forward pass processing module 1141 programmed to perform the forward pass process described above and a backward pass processing module 1142 programmed to perform the backward pass processes described above. The adaptive learning module 1143 includes one or more adaptive learning algorithms that can be used by the backward pass processing module to update the weights and biases of a neural network, such as a recurrent neural network, as described above. In some of these embodiments, the classification training module 1140 can iteratively perform the training processes using different training data to continuously improve and update the neural network. The classification training module 1140 can store the updated neural network in the memory 1128. The processor 1120, can be a micro-controller, a digital signal processor (DSP), or other processing components, for controlling and facilitating the operations of the classification training system 1100, including controlling communications with internal and external devices. The classification training system 1100 further includes one or more communication channels such as a bus for facilitating communication of data between various components of the classification system 1200.

Components may include device modules 1125 for providing device operation and functionality, which may include input/output components 1126 such as a touch screen, keyboard, mouse, etc., a display 1127 such as a monitor, a memory 1128 such as RAM, solid state drive, disk drive, database, etc., and a communications interface 1129. In some embodiments, the communications interface 1129 may include a network interface (e.g., Ethernet interface) or a wireless transceiver for enabling the classification system to communicate with remote devices over a network. In operation, training of the neural network is performed by classification training system 1100 offline and the trained model including the weights and biases of the neural network will be stored in Classification system 1200.

Figure 12:
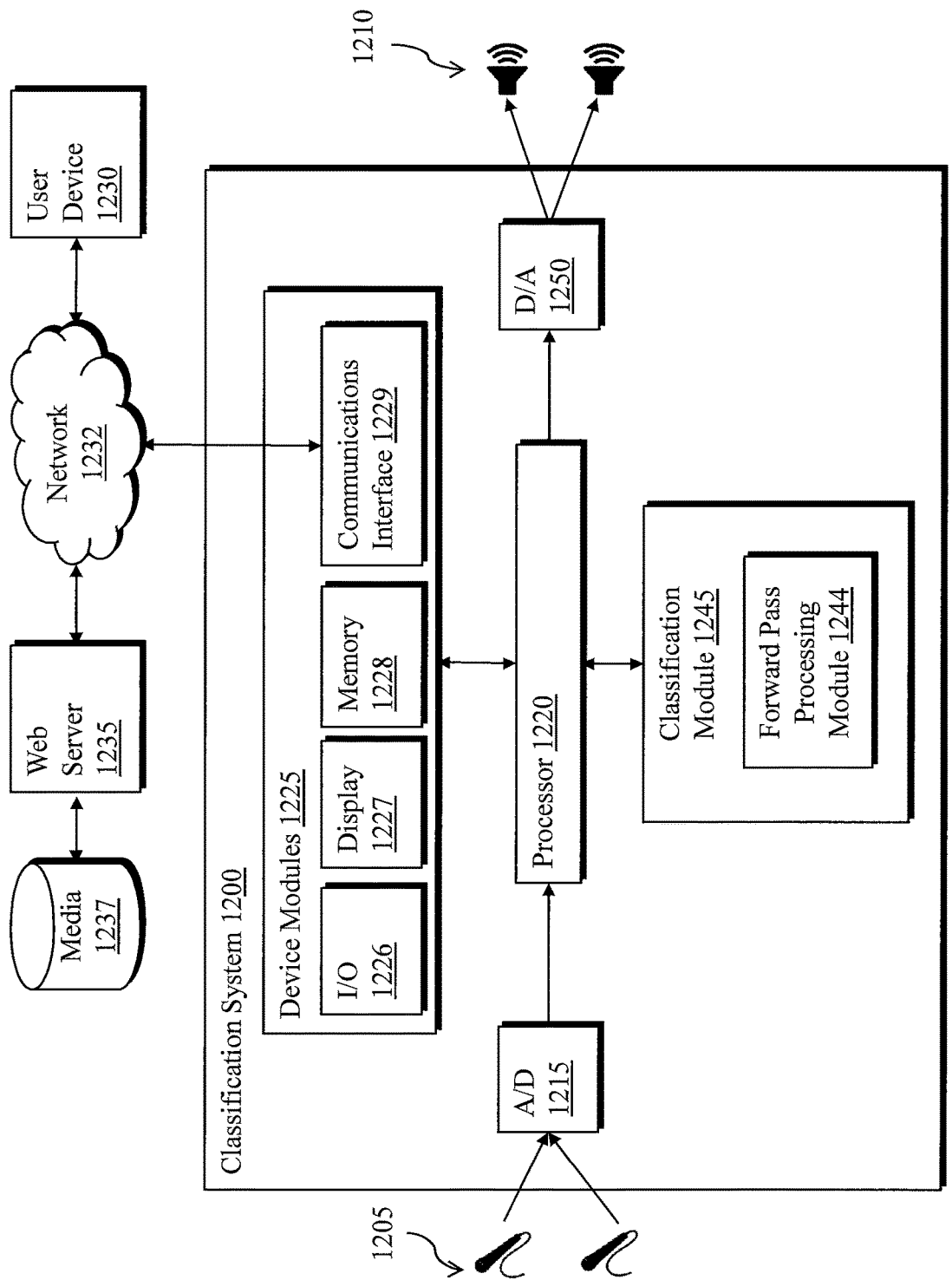
FIG. 12 is a block diagram illustrating a multi-class classification system, in accordance with an embodiment.

FIG. 12 illustrates an example classification system 1200 of some embodiments that performs at least part of the classification training process described above. The classification system 1200 may be implemented as a mobile device, such as a smart phone or a laptop computer, a television or display monitor, a display computer, a computer server, an automobile, a speech recognition system, or any other device that provides audio keywords (e.g., commands) recognition capability. The classification system 1200 is communicatively coupled with one or more audio inputting devices 1205 such as a microphone and optionally also with one or more audio outputting devices 1210 such as a loudspeaker.

In some embodiments, the classification system 1200 can include an analog-to-digital converter 1215 that converts the analog audio signals received from the audio inputting devices 1205 into digital audio signals and sends the digital audio signals to processor 1220, which can be a micro-controller, a digital signal processor (DSP), or other processing components, for controlling and facilitating the operations of the classification system 1200, including controlling communications with internal and external devices. The classification system 1200 may also include a digital-to-analog converter 1250 that converts digital audio signals generated by the different modules and components of the classification system 1200 to analog signals before transmitting the analog signals to the one or more audio outputting devices 1210.

The classification system 1200 includes one or more communication channels such as a bus for facilitating communication of data between various components of the classification system 1200. Components may include device modules 1225 for providing device operation and functionality, which may include input/output components 1226 such as a touch screen, keyboard, mouse, etc., a display 1227 such as a monitor, a memory 1228 such as RAM, solid state drive, disk drive, database, etc., and a communications interface 1229. In some embodiments, the communications interface 1229 may include a network interface (e.g., Ethernet interface) or a wireless transceiver for enabling the classification system to communicate with remote devices over a network 1232. Remote devices may include user devices 1230 (e.g., household appliances, other user electronics, etc.), or a web server 1235 that is communicatively coupled with a media storage 1237.

The classification system 1200 also includes a classification module 1245 programmed to use the neural network that was trained and updated by the classification training system 1100. The classification module includes the forward pass processing module 1244. In one embodiment, Forward Pass Processing Module 1244 is programmed to perform classification and prediction on audio input data received from audio inputting devices 1205. In various embodiments, classification module 1245 may include other parts of the automatic speech recognition (ASR) module such as language processing providing voice command processing, an image search and classification system, an object detection system, or other application configured for use with the neural network as described herein. The forward pass processing module 1244 can generate a response based on a recurrent neural network in real-time or close to real-time of the audio input. In some embodiments, the classification module 1245 can be programmed to output the response as an audio sound via the digital-to-analog converter 1250 and the audio outputting devices 1210. Instead of or in addition to producing and audio signal, the classification module 1245 can be programmed to send a signal to an external device (e.g., to initiate an action or a transaction through the external device) based on the generated response. For example, the classification system 1200 can be part of or communicatively coupled with a smart home system, and send a signal to a user device (e.g., a household appliance) via a network 1232 (e.g., a local area network within the user's residence) based on the generated response (e.g., sending a signal to turn on the television based on the response generated by an audio input from the user). In another example, the classification system 1200 can initiate a transaction with a web server 1235 over the Internet based on the generated response (e.g., sending a signal to the web server 1235 to purchase a movie stored in media storage 1237 based on the response generated by an audio input from the user). The classification system disclosed herein is not limited to processing audio signals but can be used to train a neural network to process different input (e.g., image data, video data, etc.) as well.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably program the computing device to provide the roles, responsibilities, or other functionality as discussed above with respect to the disclosed apparatus. In especially preferred embodiments, the various servers, systems, databases, or interfaces exchange data using standardized protocols or algorithms, possibly based on Hypertext Transfer Protocol (HTTP), Time-Triggered Protocol (TTP), Hypertext Transfer Protocol Secure (HTTPS), Advanced Encryption Standard (AES), public-private key exchanges, web service application program interfaces (APIs), known financial transaction protocols, or other electronic information exchanging methods. Data exchanges preferably are conducted over a packet-switched network, the Internet, local area network (LAN), wide area network (WAN), virtual private network (VPN), or other type of packet switched network.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method for training a recurrent neural network for speech recognition comprising:
   receiving, at a computing device, a stream of training data including a plurality of input samples having segmented labeled data;
   computing, by the computing device, a network output for each input sample in a forward pass through the training data; and
   updating, by the computing device, weights and biases through a backward pass through the training data, including determining whether an input frame is in a Region of Target (ROT), estimating the update of the weights and the biases of the recurrent neural network based, and adaptively learning to improve a convergence rate of the recurrent neural network;
   wherein the recurrent neural network is trained for multi-class classification using two cost functions to compute a signal error, the two cost functions comprising a One Spike Connectionist Temporal Classification (OSCTC) cost function used for a target node of the ROT and a blank node, and a cross entropy cost function used for remaining nodes of the recurrent neural network.

2. The computer-implemented method of claim 1 wherein the recurrent neural network is trained for phenome recognition using multi-class classification.

3. The computer-implemented method of claim 2 wherein updating, by the computing device, weights and biases through a backward pass further comprises computing signal error for all out nodes using a cross-entropy cost function for non-ROT regions.

4. The computer-implemented method of claim 2 further comprising computing a soft target for all the frames of the ROT.

5. The computer-implemented method of claim 2 wherein a probability of having one spike the ROT for the target node of the input frame is calculated based on the output of the target node and the output of the remaining nodes.

6. The computer-implemented method of claim 1 further comprising finding ROT information, including a beginning and length of the ROT.

7. The computer-implemented method of claim 1 wherein adaptively learning to improve a convergence rate of the recurrent neural network comprises determining a momentum for the weights and biases of an output layer and computing root mean square of gradients for the weights and biases not in the output layer.

8. The computer-implemented method of claim 1 wherein recurrent neural network is trained for keyword detection using binary classification, and wherein the recurrent neural network is trained to generate a spike when the keyword is detected.

9. The computer-implemented method of claim 8 further comprising:
   calculating a signal output error for each network output based on the determination of whether the input frame is in the ROT; and
   updating the weights and biases during a backward pass based on the calculated signal output error.

10. The computer-implemented method of claim 9 wherein updating the weights and biases during the backward pass further comprises applying a cross-entropy cost function if the input frame is not in the ROT.

11. The computer-implemented method of claim 10 wherein calculating the signal output error for each output comprises:
    obtaining ROT information for the input frame, including a length and beginning of the ROT;
    computing a soft target value using the ROT information; and
    computing the signal output error using the computed soft target value and network output value.

12. A classification training system comprising:
    a recurrent neural network for use in a classification of input data;
    a training dataset providing segmented labeled training examples; and
    a classification training module for training the neural network using the segmented labeled training data, the classification training module comprising a forward pass processing module, and a backward pass processing module;

wherein the forward pass processing module is operable to train the neural network by generating neural network outputs for the training dataset using current value of weights and bias for the neural network; and wherein the backward pass processing module is configured to train the neural network by updating the weights and biases by passing backward through generated neural network outputs, determining whether an input frame is in a Region of Target (ROT), and adaptively learning to improve a convergence rate of the neural network; and wherein the recurrent neural network is trained for multi-class classification using two cost functions to compute a signal error, the two cost functions comprising a One Spike Connectionist Temporal Classification (OSCTC) cost function used for a target node of the ROT and a blank node, and a cross entropy cost function used for remaining nodes of the recurrent neural network.

13. The training system of claim 12 wherein the weights and biases are updated by computing signal error for all out nodes using a cross-entropy cost function for non-ROT regions.

14. The training system of claim 13 wherein the neural network is a recurrent neural network; and wherein the weights and biases are updated by improving the convergence rate of the recurrent neural network using an adaptive learning rate algorithm.

15. The training system of claim 14 further comprising a memory storing an ROT table; and wherein the backward pass module comprises an ROT information module operable to find a beginning and a length of the ROT using a ROT table.

16. The training system of claim 15 wherein the backward pass module comprises a soft target module operable for computing a soft target for all the frames of the ROT.

17. The training system of claim 12 wherein the classification training module is operable to train for phoneme recognition using multi-class classification.

18. The training system of claim 12 wherein the classification training module is operable to train for keyword spotting using binary classification.

19. The training system of claim 12 wherein a probability of having one spike the ROT for the target node of the input frame is calculated based on the output of the target node and the output of the remaining nodes.

20. The training system of claim 12 wherein adaptively learning to improve a convergence rate of the neural network comprises determining a momentum for the weights and biases of an output layer and computing a root mean square of gradients for all of the weights and biases other than in the output layer.

* * * * *